US012596490B2

(12) United States Patent
Choquette et al.

(10) Patent No.: US 12,596,490 B2
(45) Date of Patent: Apr. 7, 2026

(54) MEMORY MANAGEMENT USING A REGISTER

(71) Applicant: NVIDIA Corporation, Santa Clara, CA (US)

(72) Inventors: Jack H. Choquette, Palo Alto, CA (US); Stephen Anthony Bernard Jones, San Francisco, CA (US); Maciej Piotr Tyrlik, Durham, NC (US); Harold Carter Edwards, Campbell, CA (US); Manan Patel, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 18/604,149

(22) Filed: Mar. 13, 2024

(65) Prior Publication Data

US 2025/0291502 A1      Sep. 18, 2025

(51) Int. Cl.
*G06F 3/00* (2006.01)
*G06F 3/06* (2006.01)
*G06F 12/00* (2006.01)

(52) U.S. Cl.
CPC .......... *G06F 3/0631* (2013.01); *G06F 3/0613* (2013.01); *G06F 3/064* (2013.01); *G06F 3/0673* (2013.01)

(58) Field of Classification Search
CPC ...... G06F 3/0631; G06F 3/0613; G06F 3/064; G06F 3/0673

USPC ......................................................... 711/154
See application file for complete search history.

(56) References Cited

U.S. PATENT DOCUMENTS

| | | | | |
|---|---|---|---|---|
| 5,490,274 A * | 2/1996 | Zbikowski | ............ | G06F 3/0644 |
| | | | | 711/170 |
| 5,524,255 A * | 6/1996 | Beard | .................... | G06F 9/3004 |
| | | | | 712/E9.055 |
| 5,895,495 A * | 4/1999 | Arimilli | .............. | G06F 12/0811 |
| | | | | 711/E12.024 |
| 6,038,636 A * | 3/2000 | Brown, III | ............ | G06F 3/0679 |
| | | | | 711/170 |
| 6,175,900 B1 * | 1/2001 | Forin | .................... | G06F 12/023 |
| | | | | 711/170 |
| 6,212,605 B1 * | 4/2001 | Arimilli | ................ | G06F 12/126 |
| | | | | 711/E12.075 |
| 6,567,873 B1 * | 5/2003 | Henriksen | ........... | G06F 13/3625 |
| | | | | 710/240 |
| 6,640,290 B1 * | 10/2003 | Forin | .................... | G06F 12/023 |
| | | | | 711/170 |

(Continued)

*Primary Examiner* — Sheng Jen Tsai
(74) *Attorney, Agent, or Firm* — Lowenstein Sandler LLP

(57) ABSTRACT

A first request to allocate one or more memory blocks of a first plurality of memory blocks associated with a first memory is received by a processing device. A consecutive set of a first portion of bits of a first register with a first logical state is identified. The first logical state indicates that corresponding memory blocks of the one or more memory blocks are free. A first operation to adjust the consecutive set of the first portion of bits of the first register to a second logical state is performed. An allocation address comprising an index of the consecutive set of the first portion of bits of the first register is sent to the first request. The allocation address is useable to access the corresponding memory blocks.

20 Claims, 12 Drawing Sheets

(56)                    References Cited

U.S. PATENT DOCUMENTS

| | | | | |
|---|---|---|---|---|
| 7,900,008 B2 * | 3/2011 | Shmueli | ............... | G06F 9/5016 |
| | | | | 711/170 |
| 9,805,044 B1 * | 10/2017 | Armangau | .............. | G06F 3/067 |
| 9,965,201 B1 * | 5/2018 | Bono | .................... | G06F 3/0665 |
| 10,482,012 B1 * | 11/2019 | Gordon | ................ | G06F 3/0608 |
| 10,970,259 B1 * | 4/2021 | Bono | .................. | G06F 16/1748 |
| 2003/0074486 A1 * | 4/2003 | Anastasiadis | ......... | H04N 7/165 |
| | | | | 719/321 |
| 2004/0186945 A1 * | 9/2004 | Jeter, Jr. | ............. | G06F 11/2069 |
| | | | | 714/E11.105 |
| 2009/0198695 A1 * | 8/2009 | Arimilli | ............... | G06F 9/3004 |
| 2009/0198849 A1 * | 8/2009 | Arimilli | ............... | G06F 9/3004 |
| | | | | 710/200 |
| 2009/0198916 A1 * | 8/2009 | Arimilli | ............... | G06F 9/3004 |
| | | | | 711/E12.098 |
| 2009/0198920 A1 * | 8/2009 | Arimilli | ................. | G06F 15/16 |
| | | | | 711/E12.001 |
| 2009/0198933 A1 * | 8/2009 | Arimilli | ................. | G06F 9/526 |
| | | | | 711/E12.008 |
| 2010/0030994 A1 * | 2/2010 | Guzman | ............ | G06F 12/0223 |
| | | | | 711/E12.002 |
| 2011/0153989 A1 * | 6/2011 | Rajwar | ............... | G06F 9/30038 |
| | | | | 712/225 |
| 2011/0296256 A1 * | 12/2011 | Watkins | .............. | G06F 11/0724 |
| | | | | 714/54 |
| 2011/0314246 A1 * | 12/2011 | Miller | ................... | G06F 3/0604 |
| | | | | 711/170 |
| 2014/0164730 A1 * | 6/2014 | Gold | .................... | G06F 3/0683 |
| | | | | 711/171 |
| 2015/0269065 A1 * | 9/2015 | Bourd | .................... | G06F 9/526 |
| | | | | 711/155 |
| 2017/0200094 A1 * | 7/2017 | Bruestle | ................... | G06F 5/01 |
| 2017/0286115 A1 * | 10/2017 | Coleman | .............. | G06F 9/3005 |
| 2019/0065276 A1 * | 2/2019 | van Riel | .............. | G06F 9/5077 |
| 2019/0236002 A1 * | 8/2019 | Chawla | ................. | G06F 3/0608 |
| 2021/0089363 A1 * | 3/2021 | Bergsma | ............. | G06F 9/4881 |
| 2021/0150371 A1 * | 5/2021 | Marder | ................. | G06N 3/086 |
| 2021/0247978 A1 * | 8/2021 | Malladi | .............. | G06F 15/7821 |
| 2023/0244996 A1 * | 8/2023 | Kumar | .................. | G06N 20/00 |
| | | | | 706/12 |
| 2023/0315596 A1 * | 10/2023 | Nelson | ................... | G06F 11/26 |
| | | | | 714/37 |
| 2025/0131239 A1 * | 4/2025 | Gokhale | ............... | G06N 10/60 |
| 2025/0272157 A1 * | 8/2025 | Parle | .................... | G06F 9/5055 |

* cited by examiner

200

Software State Register Values 322
1111111100000000
Bit Mask 324 → 0000000011111111
Combined Value 326 → 0000000000000000
Tensor Memory 310
Free Blocks
Allocated Blocks
Software State Register 320
1111111100000000
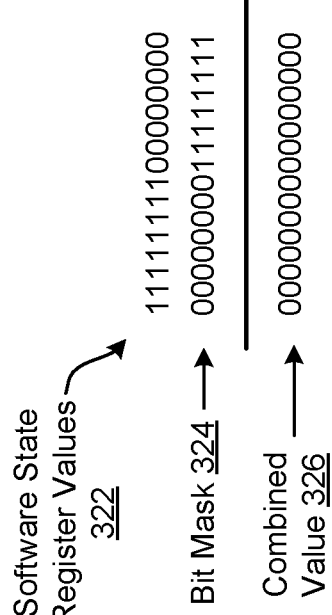
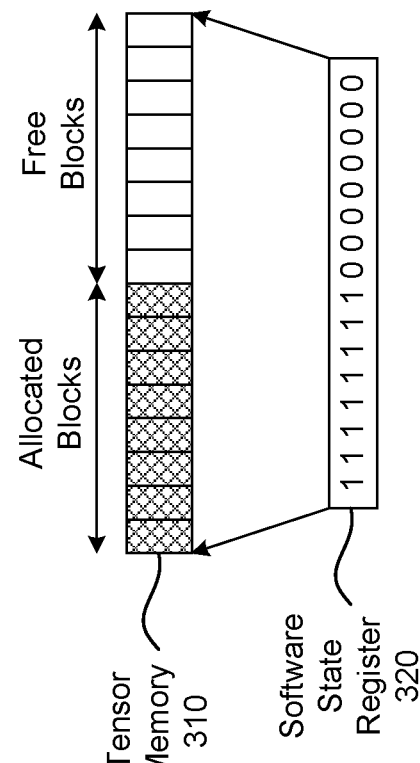
FIG. 3

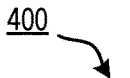

400

```
┌─────────────────────┐
│     Token = Clear   │
│       Size = N      │
│         402         │
└─────────────────────┘
           │
           ▼
┌─────────────────────┐
│        Set          │
retry ──▶│   (size, token)    │◀── retry
│         404         │
└─────────────────────┘
           │
           ▼
       ◇ Token ==        No      ◇ Anti-Starvation    Yes
       Current ID?  ──────────▶    Mode? 410
          406                                        │
           │ Yes                     No              │
           ▼                          │              │
┌──────────────────┐  Fail  ┌─────────────────┐◀─────┘
│   Token = Set    │◀───────│    Allocate     │
│ Mode = Anti-     │        │  (size, token)  │
│   Starvation     │        │       408       │
│       412        │        └─────────────────┘
└──────────────────┘                │
                                    │ Success
                                    ▼
                          ┌──────────────────┐
                          │  Mode = Normal   │
                          │ Update Current ID│
                          │  Return Offset   │
                          │       414        │
                          └──────────────────┘
```

FIG. 4

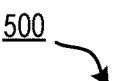

500

Receive, by a processing device, a first request to allocate one or more memory blocks of a first plurality of memory blocks associated with a first memory
502

Identify a consecutive set of a first portion of bits of a first register with a first logical state, the first logical state indicates that corresponding memory blocks of the one or more memory blocks are free
504

Perform a first operation to adjust the consecutive set of the first portion of bits of the first register to a second logical state
506

Send an allocation address including an index of the consecutive set of the first portion of bits of the first register to the first request, wherein the allocation address is useable to access the corresponding memory blocks
508

FIG. 5

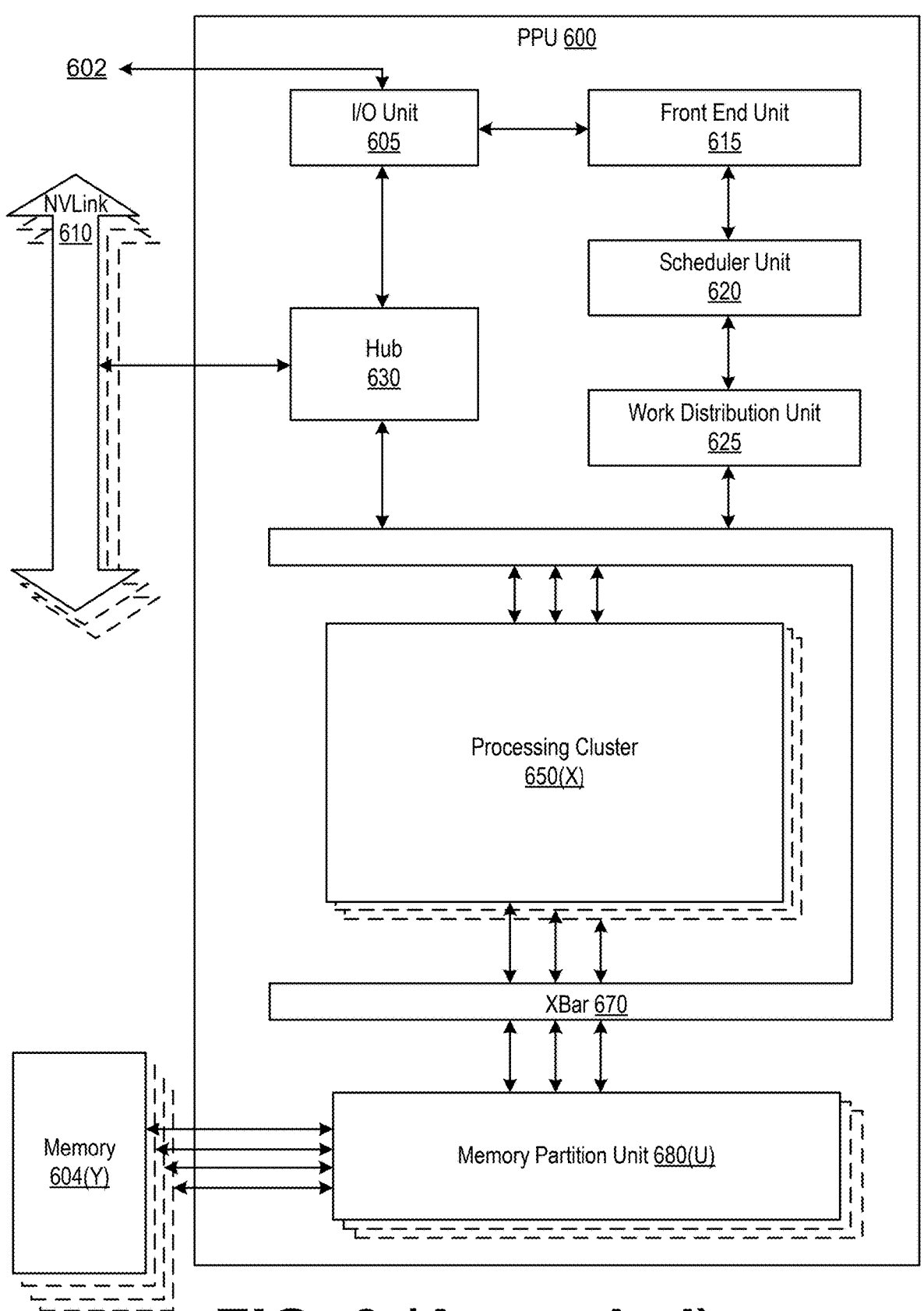
FIG. 6 (Amended)

Memory Partition Unit
680

ROP 750

L2 Cache
760

Memory Interface
770

XBar 670

865

MEMORY MANAGEMENT USING A REGISTER

FIELD OF THE INVENTION

The present disclosure is generally related to memory management in computer systems, and more particularly, to memory management using a register.

BACKGROUND

Modern computer systems often include memory management features that enable programs to request memory during runtime. The program may use the memory for storing data and the amount of memory used by a program may change over time. The program may submit requests for memory and requests to release memory and a memory allocation and deallocation may be performed, respectively. Memory allocation may involve identifying available memory and enabling the memory to be used by the program. Memory deallocation may involve releasing previously used memory so that it can be subsequently reused.

BRIEF DESCRIPTION OF THE DRAWINGS

FIG. 3 depicts an example of a tensor memory and a software state register for accelerating bitmap allocation, in accordance with at least embodiment of the present disclosure.

FIG. 4 illustrates a flowchart of a method for ensuring memory allocation fairness, in accordance with at least one embodiment of the present disclosure.

FIG. 5 illustrates a flow chart of a method for memory management using a register, in accordance with at least one embodiment of the present disclosure.

FIG. 6 illustrates a parallel processing unit, in accordance with an embodiment.

DETAILED DESCRIPTION

Figure 1:
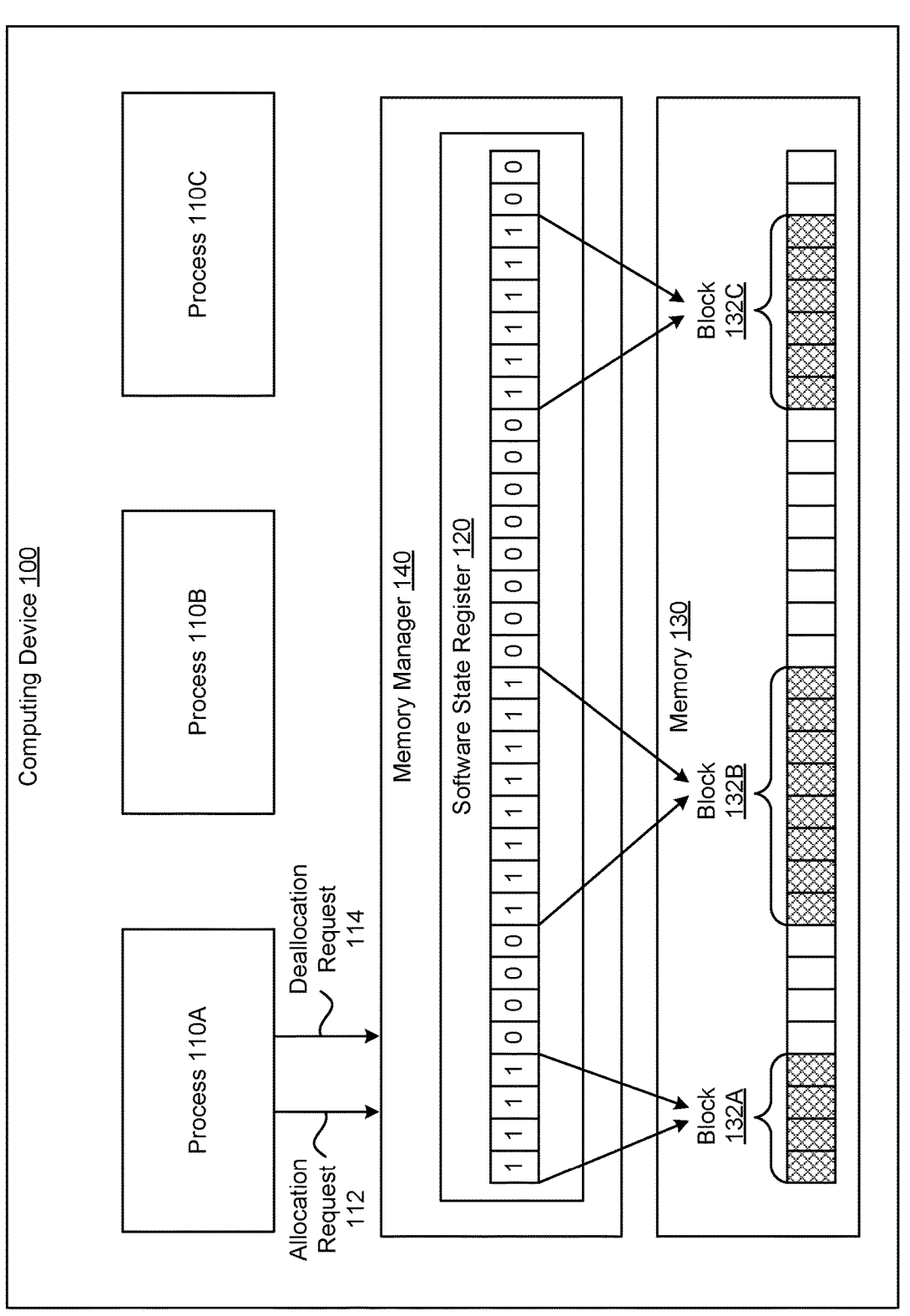
FIG. 1 depicts an illustrative architecture of computing device, in accordance with at least one embodiment of the present disclosure.

Modern computing systems include memory management components that manage allocation and deallocation of memory and include techniques to optimize memory reuse. Memory reuse may involve fulfilling a memory allocation request with memory that was previously deallocated. Memory management involves dividing available memory into memory blocks, tracking the status of memory blocks, and providing memory blocks to programs/processes when requested.

One memory management strategy includes using a bitmap structure for memory allocation/deallocation. Bitmap allocation is a memory management technique that uses a sequence of bits (e.g., a bitmap) to represent a status of memory blocks in a memory. Memory can logically be divided into memory blocks (e.g., fixed-size memory blocks, variable-size memory blocks) that software (e.g., an operating system, a memory allocator, etc.) is responsible for allocating and deallocating as memory blocks are requested by programs. Each bit in the bitmap can correspond to a specific memory block, and its value can indicate whether the block is free or allocated. For example, a given bit of a bitmap with a logical value of '0' can indicate that the corresponding memory block is free. A given bit of the bitmap with a logical value of '1' can indicate that the corresponding memory block is allocated. Initially, the memory can logically be considered as contiguous set of free memory blocks, the corresponding bitmap is accordingly initialized with all bits set to '0.' When a program requests memory, a software algorithm can search the bitmap for a sequence of free blocks that accommodate the requested size. For example, the software algorithm may create a bitmask representing the allocation size, and find a contiguous set of bits with logical value '0' that fit the mask. Once found, the software algorithm can set the corresponding bits to '1' and return an address to the program. When managing a memory pool that involves application allocating/deallocation fixed-sized contiguous blocks of memory, a bitmap allocation can be an efficient technique to track allocation status of each memory block.

Conventional systems may maintain the bitmap data structure in software, in which a software layer is responsible for initializing, updating, and querying the bitmap data structure. However, runtime of such a software can have long execution time. For example, conventional software implementations may use atomic instructions that can require 300 or more clock cycles to execute. Additionally, conventional implementations of memory allocation using a bitmap may result in memory fragmentation. Memory fragmentation occurs when free blocks of memory are scattered throughout the address space in non-contiguous blocks. Memory fragmentation can lead to situations in which there may be sufficient memory overall to fulfill a memory allocation request, but the memory is not contiguous, thereby making it difficult or even impossible to satisfy a memory allocation request for many blocks of memory.

Aspects and implementations of the present disclosure address the above deficiencies and other deficiencies of conventional memory management systems by providing a register (referred to as a "software state register" herein) to store a bitmap and instructions that operate on the software state register. It can be strongly noted that the term software state register is used herein by way of convenience, and not by way of limitation, noting that the software state register is a hardware register that may store values useable by one or more techniques described herein. The software state register can be designed such that software (e.g., an Operating System (OS), a driver, etc.) can use defined capabilities and operations to implement/accelerate a variety of software algorithms. In at least one embodiment, one or more operations can be defined to operate on a software state register to perform memory allocation/deallocation. In one example, a computing device may receive a request to allocate memory. In at least one embodiment, the request may include a size of the requested allocation. For example, the request may include an allocation size of '7,' indicating a request to allocate seven blocks of memory, where each block of memory is of a pre-determined size. The software state register can identify seven consecutive bits of pre-determined logical state indicating that the corresponding blocks of memory are free. For example, the computing device may identify two consecutive bits with a logical state of '0,' indicating that the corresponding memory blocks are free. The computing device may update the identified two consecutive bits of the software state register to a logical state of '1,' indicating that the corresponding memory blocks are now allocated. The computing device may return an index of the two consecutive bits, which may be usable as the address to access to corresponding memory blocks. Accordingly, a single instruction may be used to perform an allocation using the software state register instead of executing 100 or more instructions to query and update a bitmap implemented in software.

In at least one embodiment, aspects and implementations of the present disclosure may resolve the issue of memory fragmentation by implementing an allocation policy that enforces memory allocations to be aligned with their size. For example, the allocation policy may only allow requestors to request a subset of allocation sizes, such as 32 KB, 64 KB, and 128 KB. Allocation sizes may accordingly be limited, thereby mitigating the issue of memory fragmentation.

In at least one embodiment, aspects and implementations of the present disclosure may be implemented within a specialized hardware architecture, such as parallel processing units (PPUs). PPUs are designed to extract high performance using a large number of small, parallel execution threads on dedicated programmable multiprocessors. In PPUs, a group of threads, such as a warp, may execute the same instruction concurrently on a multiprocessor (e.g., a Streaming Multiprocessor (SM), a Compute Unit (CU), etc.) with different input data. This execution model is referred to as Single Instruction, Multiple Thread (SIMT) and is commonly utilized in parallel computing. PPUs are designed to execute a program (e.g., a kernel, a shader program, etc.) in parallel by many groups of threads on the PPU in which each thread of the groups of threads typically operates on a different portion of data.

In at least one embodiment, a software state register may be included within multiprocessors of a PPU and may be useable to allocate memory disposed on respective multiprocessors. For example, a PPU may include multiple Texture Processor Clusters (TPCs) that are higher-level groupings to organize the architecture and capabilities of a portion of the PPU. Each TPC may include two or more multiprocessors that each include processing core, functional units, register, memories, and other components. In an illustrative example, a multiprocessor may include a tensor memory. Memory management techniques described herein may allow multiple groups of threads to cooperatively use tensor memory of a given multiprocessor. For example, allocations to the tensor memory may be managed through a programming model associated with the PPU that provide a set operations to allocate and deallocate the tensor memory using the software state register. The PPU can fulfill allocation requests by identifying free blocks of tensor memory using the software state register.

In some instance, two distinct processes may request uniform allocations to respective memories, meaning the two distinct processors may request the returned allocation addresses to the be the same. For example, two multiprocessor of a given TPC of a PPU may require uniform allocations to respective tensor memories. Such a request is conventionally handled using complicated software algorithms to coordinate between the two independent requestors and enable uniform memory allocation. In at least one embodiment, uniform memory allocation may be simplified by defining an operation in the PPU programming model that enables a same tensor memory allocations to be performed across two or more multiprocessors of a TPC and return the same allocation address.

In some embodiments, the software stage register may be designed to allow software to implement one or more algorithms in addition to memory allocation/deallocation in the context of PPU architecture. For example, aspects and implementations of the present disclosure may provide a set of instructions that operate on an upper N bits of a software state register of a multiprocessor for the purpose of memory allocation/reallocation. Additionally, a set of instructions may be provided that operate on a lower M bits of the software state register of the SM. For example, the lower M bits of the software state register may be used for message passing or synchronization between groups of threads (e.g., warps, Cooperative Thread Arrays (CTAs), thread blocks, etc.) and/or for implementing anti-starvation techniques associated with memory allocation, as described in detail below.

Advantages of the technology disclosure herein include, but are not limited, decreased latency and memory fragmentation associated with memory allocation based using a bitmap. This can be accomplished by providing a software state register for maintaining a bitmap and a set of instructions to perform memory allocation/allocation using bitmap maintained within software state register. Additionally, PPU architectures may leverage a portion of bits of the software state register to implement a variety of additional algorithms such as message passing, synchronization, and anti-starvation algorithms described herein.

FIG. 1 depicts an illustrative architecture of computing device, in accordance with at least one embodiment of the present disclosure. It should be noted that other architectures for computing device 100 are possible, and that the implementation of a computing device utilizing embodiments of the disclosure are not necessarily limited to the specific architecture depicted. Computing device 100 may be a single host machine or multiple host machines arranged in a heterogeneous or homogenous group (e.g., cluster or grid) and may include one or more rack mounted servers, workstations, desktop computers, notebook computers, tablet computers, mobile phones, palm-sized computing devices, personal digital assistants (PDAs), etc. In one example, computing device 100 may be a computing device implemented with x86 hardware (e.g., Intel®, AMD®). In another example, computing device 100 may be a computing device implemented with PowerPC®, SPARC®, ARM®, or other hardware. In the example shown in FIG. 1, computing device 100 may include memory 130, a memory manager 140 including a software state register 120, and one or more processes 110A-C.

Memory 130 may correspond to one or more data storage devices that are capable of storing data and may include volatile or non-volatile data storage. Volatile data storage (e.g., non-persistent storage) may store data for any duration of time but may lose the data after a power cycle or loss of power. Non-volatile data storage (e.g., persistent storage) may store data for any duration of time and may retain the data beyond a power cycle or loss of power. Memory 110 may include a one or more hardware memory devices and may include volatile memory devices (e.g., random access memory (RAM)), non-volatile memory devices (e.g., flash memory, NVRAM), and/or other types of memory devices. In one example, memory 130 may be the primary storage of computing device and may be referred to as the main memory of computing device 100. Memory 130 may be part of a caching hierarchy with multiple different physical storage devices that are organized in multiple levels that include a combination of one or more other storage devices, such as processor registers, cache devices, hard drives, solid state drives (SSD)), other data storage devices, or a combination thereof. Memory 130 may be organized or managed as one or more blocks 132A-C.

Blocks 132A-C may be units of memory 130 that may be allocated for use by one or more processes 110A-C. Blocks 132A-C may include portions of virtual memory, logical memory, physical memory, other memory, or a combination thereof. Each of the blocks 132A-C may include a sequence of bytes or bits and may be a contiguous chunk (e.g., blocks 132A-C), non-contiguous chunk, or a combination thereof. Each of blocks 132A-C may correspond to one or more memory pages, memory frames, memory segments, memory blocks, other portion of memory, or a combination thereof. In the example shown in FIG. 1, memory 110 may include three blocks 132A-C and each of the blocks may be designated to be used by one or more processes 110A-C. For example, block 132A may be allocated to process 110A, block 132B may be allocated to process 110B, and block 132C may be allocated to process 110C.

Processes 110A-C may be any computing processes that include program instructions that are executed by computing device 100. Processes 110A-C may include user space processes (e.g., application processes), a kernel processes (e.g., system processes), hypervisor processes, virtual machine processes, container processes, other processes, or a combination thereof. Each of the processes 110A-C may include one or more threads or instruction streams that can request access to memory resources and may be able to increase or decrease the amount of memory it is assigned by submitting one or more allocation requests 112 and deallocation requests 114 respectively.

An allocation request 112 may be a message transmitted from a process that requests additional memory resources be assigned to the requesting process. Allocation request 122 may or may not indicate a quantity of memory, a use of memory (e.g., Read only, read/write, Copy on Write (CoW), Compare and Swap (CaS), Find and Set (FaS), etc.), a type of memory, a duration of time, other attribute, or a combination thereof. Memory manager 140 may respond to allocation request 122 by allocating a block of memory using the software state register 120 and providing an index to the allocated block. A deallocation request 122 may be a message transmitted from the process to the memory manager 140 that requests memory resources be released. Deallocation request 122 may indicate the block to be released by providing index of the software state register 120 associated with block.

The process may initiate allocation request 122 and deallocation request 122 by executing shared code of the memory management component 130. The shared code may be accessible to each of the processes and may be statically linked or dynamically linked to the process. The shared code may originate from a shared library (e.g., shared object (SO), dynamic-link library (DLL)), an executable (EXE), other location, or a combination thereof. The shared code may include one or more function calls, operands, instructions, opcodes, commands, or a combination thereof and may be based on proprietary code, open source code, standardized code, or a combination hereof. In one example, the shared code may be from one or more standard libraries that are the same or similar to the C standard library (libc, stdlibc), C++ standard library (libc++, stdlibc++, libcu++, etc.), GNU library for C (glibc), Microsoft Standard Library (stdlib), other library, or a combination thereof. The standard library may include functions to allocate and deallocate memory and the allocation request 122 may be result of a process executing a call to malloc, alloc, realloc, calloc, new, or other memory allocation function and deallocation request 122 may be the result of the process executing a call to free, delete, release, or other memory deallocation function.

Memory manager 140 may manage memory 140 and provide memory allocation for processes 120A-C. Memory management component 140 may include features that are provided by code executing in user space, kernel space, or firmware or by features provided by hardware circuitry of a memory device or processor (e.g., Memory management Unit (MMU), memory controller). The memory allocation may involve processing allocation requests 112 and deallocation requests 114 to perform allocation and deallocation of memory. Memory manager 140 may provide processes 110A-C with access to memory by providing processes 110A-C with software state register 120 indexes.

Software state register 120 indexes may include addresses/pointers to blocks of memory that have been allocated by memory management component 140. The indexes may be generated by memory management component 140 during memory allocation and may be provided to the processes 110A-C in response to allocation requests 112. The indexes may also be provided by the process to the memory manager 140 with subsequent deallocation requests 114. Each index may include one or more memory addresses that corresponds to (e.g., mapped to) a beginning portion, an end portion, or an intermediate portion of a block of memory 130. The one or more memory addresses may correspond to a virtual memory address (e.g., virtual address), a logical memory address (e.g., logical address), a physical memory address (e.g., physical address), other address, or a combination thereof.

Figure 2:
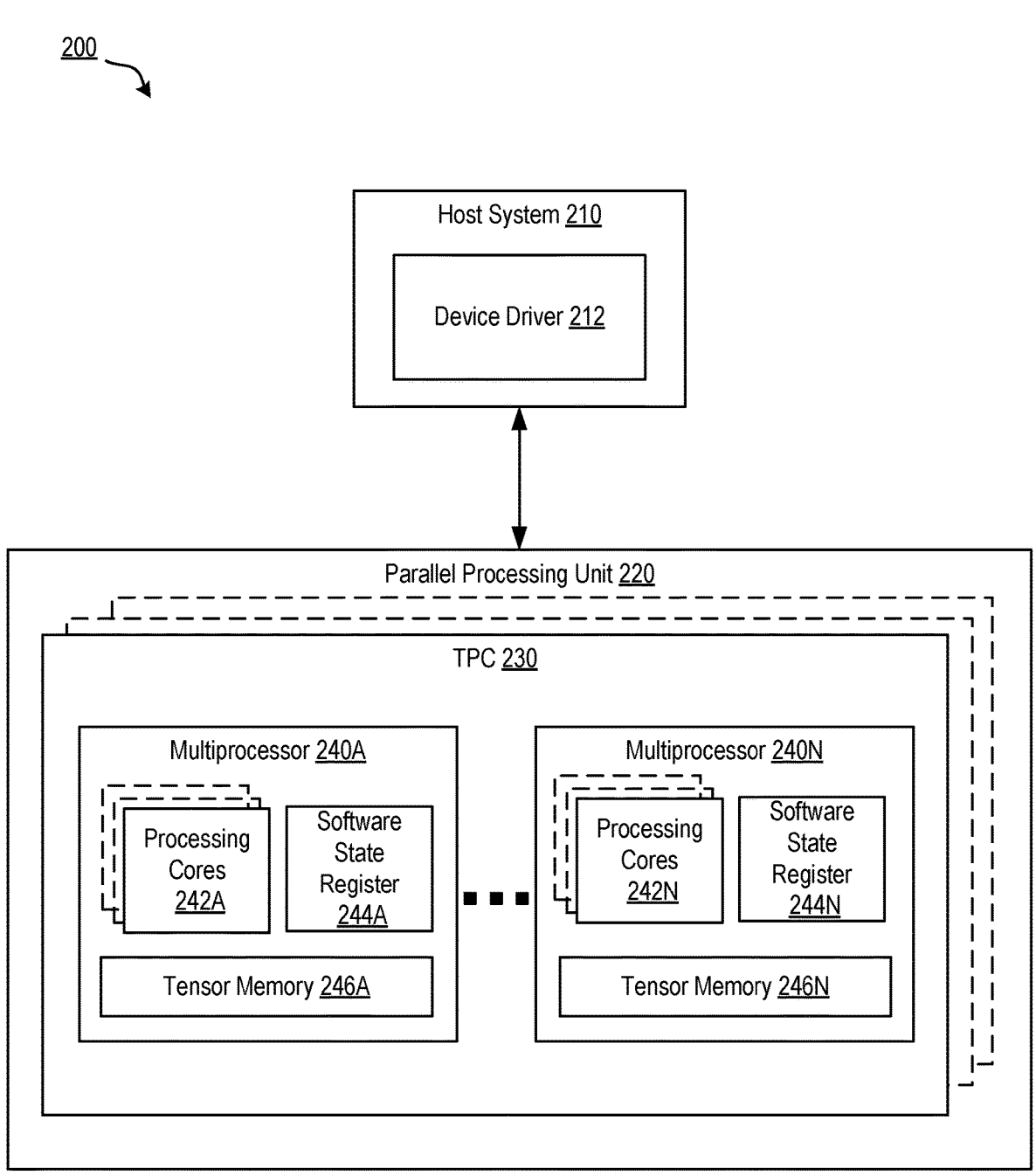
FIG. 2 depicts an illustrative architecture of a Parallel Processing Unit (PPU), in accordance with at least embodiment of the present disclosure.

FIG. 2 illustrates an example system 200 that includes a host system 210 and a Parallel Processing Unit (PPU) 220, in accordance with at least one embodiment of the present disclosure. The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes a host system (e.g., a central processor) and a PPU 220, such as a Graphics Processing Unit (GPU).

System 200 can include a host system 210 that is coupled to one or more PPUs 220. FIG. 1 illustrates one example of a host system 210 coupled to one PPU 220. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 210 can include a processor chipset and a software stack executed by the processor chipset. The processor chipset can include one or more cores, one or more caches, and a device driver 212. The host system 210 can be coupled to the PPU 220 via an interface. In at least one embodiment, devices of the system 200 may be interconnected with proprietary interconnects, standardized interconnects (e.g., PCI or PCIe), or a combination thereof. In at least one embodiment, devices of the system 200 may be interconnected with a Chip-to-Chip (C2C) or chip-to-package interconnect. In general, the host system 210 can access multiple Input/Output (I/O) device via a same interface, multiple separate interface, and/or a combination of interfaces.

PPU 220 may be composed of multiple processing clusters (e.g., GPU Processing Clusters (GPCs), Texture Processing Clusters (TPCs), multiprocessors, memory controllers, and caches. In the example illustrated with respect to FIG. 1, the PPU 220 includes multiple TPCs 230 made up of multiple multiprocessors 240A-N (referred to generally as "multiprocessor(s) 240" herein). Each multiprocessor 240, for example, may be a Streaming Multiprocessor (SM), a Compute Unit (CU), a many integrated core (MIC), and the like. Each multiprocessor 240 includes, without limitation, multiple processing cores 242, a software state register 244, and a tensor memory 246. Processing cores 242 (e.g., Compute Unified Device Architecture (CUDA) cores) may execute separate threads, allowing for parallel processing. In at least one embodiment, multiprocessors 240 may operate according to a Single-Instruction, Multiple Thread (SIMT) architecture. For example, all threads within a group of threads (e.g., a warp, a CUDA Tread Block Array (CTA), etc.) may execute the same instruction at the same time, but may operate on different data. Tensor memory may refer to memory dedicated to storing tensor data (tensors). A tensor is a multi-dimensional array that is a fundamental data structure in deep learning applications. Tensors may represent scalars, vectors, matrices, or higher-dimensional arrays. In at least one embodiment, software state register 244 may store a bitmap used for maintaining a bitmap of tensor memory 246 allocations. For example, software state register 244A may maintain a bitmap of allocations to tensor memory 246A of multiprocessor 240A while software state register 244N may maintain a bitmap of allocations to tensor memory 246N of multiprocessor 240N.

In at least one embodiment, host system 210 may include a device driver 212. Device driver 212 may implement an application programming interface (API) that defines various functions that can be utilized by an application in order to generate graphical data for display. The device driver is a software program that includes instructions that control the operation of the PPU 220. In at least one embodiment, device driver 212 includes instructions to manage allocation/deallocation of tensor memory 146 using a corresponding software state register 144.

In at least one embodiment, device driver 212 may include an operation for allocating tensor memory. For example, device driver 212 may include a Find and Set (FaS) operation that is executable by a process to initiate a tensor memory allocation request. It is appreciated that FaS operation is used herein by way of example, and not by way of limitation, noting that allocation techniques described herein can be performed in response to a call to malloc, alloc, realloc, calloc, new, or other memory allocation function. The FaS is designed to accelerate allocation of tensor memory 146 using a bitmap maintained within software state register 144. In at least one embodiment, the request may include a size of the requested allocation.

For example, the request may include an allocation size of '7,' indicating a request to allocate seven blocks of memory, where each block of memory is of a pre-determined size (e.g., 8 KB, 16 KB, 32 KB, etc.). The software state register 244 may be read to identify seven consecutive bits of a pre-determined logical state indicating that the corresponding blocks of tensor memory are free, as illustrated below with respect to FIG. 3.

FIG. 3 depicts an example of a tensor memory 310 and a software state register 320 for accelerating bitmap allocation, in accordance with at least embodiment of the present disclosure. The tensor memory includes allocated blocks of memory as indicated by allocated bits (e.g., '1') of software state register 320 and unallocated blocks of memory as indicated by free bits (e.g., '0') of state register 320.

A contiguous block of free bits (e.g., '0') may be determined by combining software state register values 322 with a bitmask 324 to generate a combined value 326. Bitmask 324 may be a numerical value that is based one or more binary values (e.g., 0000 0000 1111 1111), hexadecimal values (e.g., 0xFF), decimal values (e.g., 255), integer values, or a combination thereof. Bitmask 324 may be a value determined based on a size of a FaS operation. For example, a FaS operation associated with allocating tensor memory 310 may indicate a block size of eight. Bitmask 324 can represent the block size using one or more consecutive binary values (e.g., 0000 0000 1111 1111).

Combining software state register values 322 and bitmask 324 may involve one or more mathematical operations that generate combined value 326. The mathematical values may include bitwise operations (e.g., or, xor, and, not, shift), arithmetic operations (e.g., addition, subtraction, multiplication, division), other mathematical operation, or a combination thereof. In the example shown in FIG. 3, the software state register value 322 may be based on the available tensor memory and represented as a binary value (e.g., 1111 1111 0000 0000) and bitmask 324 be represented as a binary value (e.g., 0000 0000 1111 111). The bitmask may correspond to a size indicated in a FaS operation. Combining software state register value 322 and bitmask 324 may involve performing a bitwise AND operation that sets to produce combined value 326 (e.g., 0000 0000 0000 0000). The combined value 326 can indicate that bit values of the bitmask 324 correspond to free blocks of tensor memory 310. In at least one embodiment, shift operations may be used to manipulate bitmask 324 until consecutive blocks of free memory are determined or it is determined that there are no consecutive blocks of free memory of the indicated size.

Returning to FIG. 2, in at least one embodiment, the FaS operation may include an input parameter to enforce an allocation policy to align the allocation according to its size. To ensure an allocation is align with its size, the allocation policy may cause the starting memory address of the allocated block to be a multiple of the size of allocation. For example, if a process is calling a FaS operation requesting a 64 KB tensor memory 246 allocation with the align parameter enabled, the starting address of the allocated tensor memory 246 must be divisible by 64,000 (assuming tensor memory 246 is byte-addressable).

In at least one embodiment, the FaS operation may include an input parameter to enable uniform allocations to multiple tensor memories of a given multiprocessor. Such an input parameter may be referred to herein as "cluster size," where the cluster size determines the number multiprocessors 240 to uniformly perform a tensor memory allocation. For example, TPC 230 may include a multiprocessor 240A and a multiprocessor 240N, each including a software state register (software state register 244A and 244N, respectively) and a tensor memory (tensor memory 246A and 246N, respectively). A process may call the FaS operation with a cluster size of two. An allocation may be uniformly performed to a same address of tensor memory 246A and 246N using software state register 244A and 244N respectively such that the FaS operation returns a single address that corresponds to both allocations.

In at least one embodiment, device driver 212 may include an operation for deallocating tensor memory. For example, device driver 212 may include a Compare and Swap (CaS) operation that is executable by a process to initiate a tensor memory deallocate. It is appreciated that CaS operation is used herein by way of example, and not by way of limitation, noting that allocation techniques described herein can be performed in response to executing a call to free, delete, release, or other memory deallocation function. CaS is designed to accelerate deallocation of tensor memory 146 using a bitmap maintained within software state register 144. A CaS operation request 122 may indicate memory blocks to be released by providing an index of the memory blocks to be released. The CaS operation can free/deallocate the memory blocks by causing the software state register 244 to be updated using the indicated index of the memory block(s) within the software state register. For example, corresponding bits in the software state register 244 can be set to '0' to indicate the block(s) as free.

In at least one embodiment of the present disclosure, a class of instructions supported by PPU 220 is referred to herein as "atomic' instructions. Each of these instructions executes atomically in the sense that it, as a single instruction, can perform a series of steps to update software state registers without being interrupted by another memory access. The series of steps performed by an atomic instruction may include retrieval of the data from the software state register 244, performance of an operation on that data (Such as an addition operation), and storage of the resulting value back to the memory location. The entire series of steps is carried out in connection with the single atomic instruction. For example, read-modify-write instruction (e.g., FaS, CaS, etc.) PPU 220 can be atomic instruction. Many threads or groups of threads can have an outstanding request to perform a read-modify-write operation on software state register 244. While the PPU 220 may receive atomic operations from many threads, the PPU 220 (e.g., hardware in the PPU 220) may guarantee that read-modify-write instructions are sequenced such that they are performed atomically with respect to any other thread attempting any other operation on software state register 244. Thus, no spinning or locking may be required.

In a multi-threaded processing unit such as PPU 220, these atomic instructions can be used to prevent memory access conflicts amongst different threads. PPU 220 may support SIMD instructions issued across multiple processing cores 242 of a multiprocessor 240, resulting in multiple threads in flight concurrently. Some of the concurrently executed threads may lead to instructions (e.g., CaS, FaS, etc.) that access the same software state register. This can cause a memory conflict problem because one instruction may be in the middle of operating on data at software state register 244, and before the instruction is done, another instruction can alter the data at the memory location. Use of atomic instruction can efficiently prevent such potential memory conflicts.

For example, a first thread may be executing an atomic instruction while a second thread begins another instruction (possibly a different atomic instruction, or a different instance of the same atomic instruction). The atomic instructions are designed such that while the first thread executes its atomic instruction to update bits of the software state register 244, the second thread is not allowed to overwrite the bits at that memory location.

In at least one embodiment, allocation operations (e.g., FaS) and deallocation operations (e.g., CaS) can be atomic operations. In at least one embodiment, PPU 220 may support one or more additional operations (that may also be atomic operations) to interact with software state registers 244 including, but not limited to, load operations, store operations, bitwise operations (e.g., and, or, xor, not, shift, etc.), arithmetic operations (e.g., addition, subtraction, multiplication, division, etc.).

In at least one embodiment, software state registers 244A-N can be utilized by one or more additional software algorithms for purposes other than memory allocations and deallocation. In such an embodiment, a portion of software state register 244 can be utilized for tensor memory allocation/deallocation operations and another portion of software state register 244 can be utilized for other software algorithms. For example, the lower N bits of software state register 244 can be used to maintain a bitmap for allocation/deallocation tensor memory while the upper N bits of software state register 244 can be utilized by one or more other software algorithms. In at least one embodiment, a portion of bits of software state register 244 can utilized for message passing and/or synchronization between groups of threads (e.g., warps, thread blocks, CTAs, etc.) running on a corresponding multiprocessor 240 using one or more load, store, bitwise, and/or arithmetic operations for interacting with software state register 244.

In at least one embodiment, a portion of bits of software state register 244 can be utilized to mitigate starvation issues associated with memory allocation and ensure memory allocation fairness. Starvation in the context of memory allocation can refer to a situation in which a process of system is unable to obtain memory resources despite repeated memory allocation attempts. For example, a first process and a second process may attempt to allocate the same tensor memory 246A using the FaS operation described above. The first process may succeed in its allocation and immediately begin a subsequent allocation, preventing the second process from being served. In some instances, starvation issues can cause a system to run more slowly as a result of unfair memory allocations. In at least one embodiment, a portion of bits of software state register 244 can be used to enable a memory allocation fairness technique described below with respect to FIG. 4.

FIG. 4 illustrates a flowchart of a method 400 for ensuring memory allocation fairness, in accordance with at least one embodiment of the present disclosure. Method 400 can be performed by processing logic comprising hardware, firmware, or any combination thereof. In at least one embodiment, method 400 can be performed by a processing device such as PPU 220 or computing device 100. In at least one embodiment, a non-transitory computer-readable storage medium may store instructions that, responsive to execution by a process device, cause the processing device to perform method 400.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 402 of method 400, a process may my send an allocation request to processing logic. For example, the process may send an allocation request using the FaS operation described above. In at least one embodiment, the allocation request may include a size of the allocation (e.g., a number of memory blocks to be allocated) and an allocation token identifier (ID). For example, the process may set their allocation token ID to 'clear,' indicating that the next allocation token ID has yet to be set/assigned by the processing logic.

At operation 404 of method 400, processing logic may receive an allocation request, the allocation request including a size of the requested allocation and an allocation token ID. If the allocation token ID is not set (e.g., the allocation token ID is 'clear'), the process logic may set the allocation token ID to a value equivalent to a next allocation token ID. In at least one embodiment, the value of next allocation token ID may be tracked within a software state register, such as software state register of 244 of FIG. 2. In response to updating an allocation token ID of a process to the next allocation ID, the processing may update (e.g., increment) the value of next allocation ID within the software state register.

At operation 406 of method 400, processing logic may compare an allocation token ID of a requesting process with a current allocation token ID. In at least one embodiment, the value of current allocation token ID may be stored with a software state register, such as software state register 244 of FIG. 2, and may correspond to an allocation token ID a process that has priority for its allocation request to be serviced. Responsive to a determination that an allocation token ID is equivalent to the current allocation token ID, the method continues to operation 408. Responsive to a determination that the allocation token ID is not equivalent to the current allocation token ID, the method continues to operation 410.

At operation 408 of method 400, the processing logic can attempt to service a memory allocation request. Processing logic may perform the allocation according to one or more of the above-described techniques. In at least one embodiment, if the allocation fails (e.g., due to insufficient free memory blocks), method 400 continues to operation 412. If the allocation succeeds, method 400 continues to operation 414.

At operation 412 of method 400, the processing logic can indicate allocation token ID is already set and enable anti-starvation mode. By indicating that allocation token ID is already set, the allocation token ID will not be reset at operation 404 when the allocation is retried. By enabling anti-starvation mode, the processing logic (at operation 410) can prevent allocation requests from attempting to allocate memory out of turn (e.g., when allocation token ID is not equivalent to current allocation token ID).

At operation 414 of memory method 400, processing logic can enable normal mode of operation (e.g., disable anti-starvation mode). Accordingly, in some embodiments, anti-starvation mode may be enabled when an allocation fails. In other embodiments, operation 414 may maintain anti-starvation mode such that anti-starvation mode is enabled throughout course of multiple memory allocations. Processing logic may update (e.g., increment) the value of current allocation ID within the software state register such that a subsequent allocation requestion may be serviced. Processing logic may return an offset of the memory allocation to the requesting process to enable access to an allocation of corresponding memory.

At operation 410 of method 400, responsive to a determination that anti-starvation mode is enabled, method 400 may continue to operation 404. Responsive to a determination that anti-starvation mode is not enabled (e.g., mode is set to 'normal'), method 400 may continue to operation 408.

FIG. 5 illustrates a flow chart of a method 500 for memory management using a register, in accordance with at least one embodiment of the present disclosure. Although method 500 is described in the context of a processing unit, the method 500 may also be performed by a program, custom circuitry, or by a combination of custom circuitry and a program. For example, the method 400 may be executed by a Parallel processing unit (PPU), CPU (central processing unit), or any processing device capable of memory management. Furthermore, persons of ordinary skill in the art will understand that any system that performs method 500 is within the scope and spirit of embodiments of the present invention.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 502 of method 500, processing logic may receive a first request to allocate one or more memory blocks of a first plurality of memory blocks associated with a first memory.

At operation 504 of method 500, processing logic may identify a consecutive set of a first portion of bits of a first register with a first logic state. The first logical state (e.g., logic '0') indicates that corresponding memory block of the one or more memory blocks are free. In at least one embodiment, the consecutive set of the first portion of bits of the first register is aligned with a size of the corresponding memory blocks, wherein the processing logic includes a graphics processing unit (GPU), and the first register is associated with a first multiprocessor within the GPU. For example, processing logic may be included with PPU 220, and the first register may include software state register 244A. In at least one embodiment, the first memory may be a tensor memory, such as tensor memory 246A.

At operation 506 of method 500, processing logic may perform a first operation to adjust the consecutive set of the first portion of bits of the first register to a second logical state (e.g., logic '1'). The second logical may indicate that the corresponding memory blocks have been allocated.

At operation 508 of method 500, processing logic may send an allocation address including an index of the consecutive set of the first portion of bits of the first register to the first request. The allocation address is useable to access the corresponding memory blocks.

In at least one embodiment, the processing logic may receive a request to deallocate the one or more memory blocks. The processing logic may further identify the consecutive set of the first portion of bits and performing a second operation to adjust the consecutive set of the first portion of bits to the first logical state.

In at least one embodiment, the processing logic receives, with the first request, an indication to allocate one or more memory blocks of a second plurality of memory blocks associated with a second memory uniformly with the one or more memory blocks of the first plurality of memory blocks. The processing logic may identify a consecutive set of a first portion of bits of a second register using the consecutive set of the first portion of bits of the first register. The processing logic may perform a second operation to modify the consecutive set of the first portion of bits of the second register to a second logical state. An index of the consecutive set of the first portion of bits of the second register is a same index as the index of the consecutive set of the first portion of bits of the first register.

In at least one embodiment the first request may include a first instruction issued by a first thread executing on the PPU. In at least one embodiment, the processing logic may identify one or more instructions issued by one or more additional threads executing concurrently with the first thread. The processing logic may sequence one or more operations of the one or more additional threads to prevent the one or more operations from altering the consecutive set of the first portion of bits of the first register until the first operation is complete.

In at least one embodiment, the processing logic may use a second portions of bits of the first register for at least one message passing, synchronization, and memory allocation fairness. In an illustrative example, an upper N bits of the first register may be useable by processing logic for memory allocation techniques, such as memory allocation techniques described above with respect to FIGS. 1-3. A lower N bits of the software state register may be useable by processing logic to implement one or more memory allocation fairness techniques, such as the memory allocation fairness described above with respect to FIG. 4.

Parallel Processing Architecture

FIG. 6 illustrates a parallel processing unit (PPU) 600, in accordance with an embodiment. In an embodiment, the PPU 600 is a multi-threaded processor that is implemented on one or more integrated circuit devices. The PPU 600 is a latency hiding architecture designed to process many threads in parallel. A thread (e.g., a thread of execution) is an instantiation of a set of instructions configured to be executed by the PPU 600. In an embodiment, the PPU 600 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 600 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 600 may be configured to accelerate thousands of High-Performance Computing (HPC), data center, and machine learning applications. The PPU 600 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 6, the PPU 600 includes an Input/Output (I/O) unit 605, a front-end unit 615, a scheduler unit 620, a work distribution unit 625, a hub 630, a crossbar (Xbar) 670, one or more processing clusters 650 (e.g., general processing clusters (GPCs), and one or more partition units 680. The PPU 600 may be connected to a host processor or other PPUs 600 via one or more high-speed NVLink 610 interconnect. The PPU 600 may be connected to a host processor or other peripheral devices via an interconnect 602. The PPU 600 may also be connected to a local memory comprising a number of memory devices 604. In an embodiment, the local memory may comprise a number of dynamic random-access memory (DRAM) devices. The DRAM devices may be configured as a high-bandwidth memory (HBM) subsystem, with multiple DRAM dies stacked within each device.

The NVLink 610 interconnect enables systems to scale and include one or more PPUs 600 combined with one or more CPUs, supports cache coherence between the PPUs 600 and CPUs, and CPU mastering. Data and/or commands may be transmitted by the NVLink 610 through the hub 630 to/from other units of the PPU 600 such as one or more copy engines, a video encoder, a video decoder, a power management unit, etc. (not explicitly shown). The NVLink 610 is described in more detail in conjunction with FIG. 6B.

The I/O unit 605 is configured to transmit and receive communications (e.g., commands, data, etc.) from a host processor (not shown) over the interconnect 602. The I/O unit 605 may communicate with the host processor directly via the interconnect 602 or through one or more intermediate devices such as a memory bridge. In an embodiment, the I/O unit 605 may communicate with one or more other processors, such as one or more the PPUs 600 via the interconnect 602. In an embodiment, the I/O unit 605 implements a Peripheral Component Interconnect Express (PCIe) interface for communications over a PCIe bus and the interconnect 602 is a PCIe bus. In alternative embodiments, the I/O unit 605 may implement other types of well-known interfaces for communicating with external devices.

The I/O unit 605 decodes packets received via the interconnect 602. In an embodiment, the packets represent commands configured to cause the PPU 600 to perform various operations. The I/O unit 605 transmits the decoded commands to various other units of the PPU 600 as the commands may specify. For example, some commands may be transmitted to the front-end unit 615. Other commands may be transmitted to the hub 630 or other units of the PPU 600 such as one or more copy engines, a video encoder, a video decoder, a power management unit, etc. (not explicitly shown). In other words, the I/O unit 605 is configured to route communications between and among the various logical units of the PPU 600.

In an embodiment, a program executed by the host processor encodes a command stream in a buffer that provides workloads to the PPU 600 for processing. A workload may comprise several instructions and data to be processed by those instructions. The buffer is a region in a memory that is accessible (e.g., read/write) by both the host processor and the PPU 600. For example, the I/O unit 605 may be configured to access the buffer in a system memory connected to the interconnect 602 via memory requests transmitted over the interconnect 602. In an embodiment, the host processor writes the command stream to the buffer and then transmits a pointer to the start of the command stream to the PPU 600. The front-end unit 615 receives pointers to one or more command streams. The front-end unit 615 manages the one or more streams, reading commands from the streams and forwarding commands to the various units of the PPU 600.

The front-end unit 615 is coupled to a scheduler unit 620 that configures the various processing clusters 650 to process tasks defined by the one or more streams. The scheduler unit 620 is configured to track state information related to the various tasks managed by the scheduler unit 620. The state may indicate which processing cluster 650 a task is assigned to, whether the task is active or inactive, a priority level associated with the task, and so forth. The scheduler unit 620 manages the execution of a plurality of tasks on the one or more processing clusters 650.

The scheduler unit 620 is coupled to a work distribution unit 625 that is configured to dispatch tasks for execution on the processing clusters 650. The work distribution unit 625 may track a number of scheduled tasks received from the scheduler unit 620. In an embodiment, the work distribution unit 625 manages a pending task pool and an active task pool for each of the processing clusters 650. The pending task pool may comprise a number of slots (e.g., 32 slots) that contain tasks assigned to be processed by a particular processing cluster 650. The active task pool may comprise a number of slots (e.g., 4 slots) for tasks that are actively being processed by the processing clusters 650. As a processing cluster 650 finishes the execution of a task, that task is evicted from the active task pool for the processing cluster 650 and one of the other tasks from the pending task pool is selected and scheduled for execution on the processing cluster 650. If an active task has been idle on the processing cluster 650, such as while waiting for a data dependency to be resolved, then the active task may be evicted from the processing cluster 650 and returned to the pending task pool while another task in the pending task pool is selected and scheduled for execution on the processing cluster 650.

The work distribution unit 625 communicates with the one or more processing clusters 650 via XBar 670. The XBar 670 is an interconnect network that couples many of the units of the PPU 600 to other units of the PPU 600. For example, the XBar 670 may be configured to couple the work distribution unit 625 to a particular processing cluster 650. Although not shown explicitly, one or more other units of the PPU 600 may also be connected to the XBar 670 via the hub 630.

The tasks are managed by the scheduler unit 620 and dispatched to a processing cluster 650 by the work distribution unit 625. The processing cluster 650 is configured to process the task and generate results. The results may be consumed by other tasks within the processing cluster 650, routed to a different processing cluster 650 via the XBar 670, or stored in the memory 604. The results can be written to the memory 604 via the partition units 680, which implement a memory interface for reading and writing data to/from the memory 604. The results can be transmitted to another PPU 600 or CPU via the NVLink 610. In an embodiment, the PPU 600 includes a number U of partition units 680 that is equal to the number of separate and distinct memory devices 604 coupled to the PPU 600. A partition unit 680 will be described in more detail below in conjunction with FIG. 7B.

In an embodiment, a host processor executes a driver kernel that implements an application programming interface (API) that enables one or more applications executing on the host processor to schedule operations for execution on the PPU 600. In an embodiment, multiple compute applications are simultaneously executed by the PPU 600 and the PPU 600 provides isolation, quality of service (QOS), and independent address spaces for the multiple compute applications. An application may generate instructions (e.g., API calls) that cause the driver kernel to generate one or more tasks for execution by the PPU 600. The driver kernel outputs tasks to one or more streams being processed by the PPU 600. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 8A.

Figure 7A:
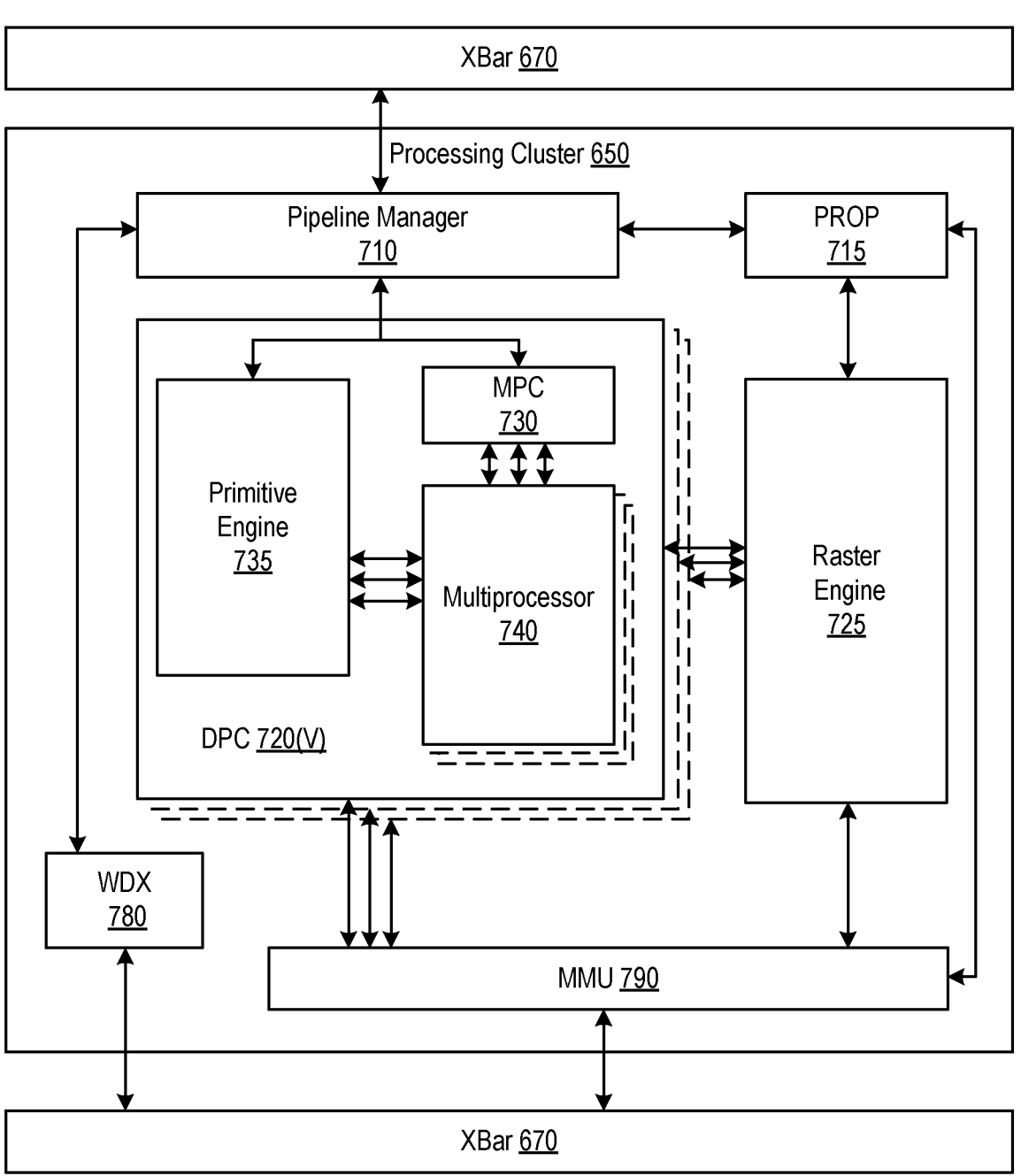
FIG. 7A illustrates a general processing cluster within the parallel processing unit of FIG. 6, in accordance with an embodiment.

FIG. 7A illustrates a processing cluster 650 of the PPU 600 of FIG. 6, in accordance with an embodiment. As shown in FIG. 7A, each processing cluster 650 includes a number of hardware units for processing tasks. In an embodiment, each processing cluster 650 includes a pipeline manager 710, a pre-raster operations unit (PROP) 715, a raster engine 725, a work distribution crossbar (WDX) 780, a memory management unit (MMU) 790, and one or more Data Processing Clusters (DPCs) 720. It will be appreciated that the processing cluster 650 of FIG. 7A may include other hardware units in lieu of or in addition to the units shown in FIG. 7A.

In an embodiment, the operation of the processing cluster 650 is controlled by the pipeline manager 710. The pipeline manager 710 manages the configuration of the one or more DPCs 720 for processing tasks allocated to the processing cluster 650. In an embodiment, the pipeline manager 710 may configure at least one of the one or more DPCs 720 to implement at least a portion of a graphics rendering pipeline. For example, a DPC 720 may be configured to execute a vertex shader program on the programmable multiprocessor 740. Multiprocessors 740 may generally include streaming multiprocessors, compute units, many integrated cores, and the like. The pipeline manager 710 may also be configured to route packets received from the work distribution unit 625 to the appropriate logical units within the processing cluster 650. For example, some packets may be routed to fixed function hardware units in the PROP 715 and/or raster engine 725 while other packets may be routed to the DPCs 720 for processing by the primitive engine 735 or the multiprocessor 740. In an embodiment, the pipeline manager 710 may configure at least one of the one or more DPCs 720 to implement a neural network model and/or a computing pipeline.

Figure 7B:
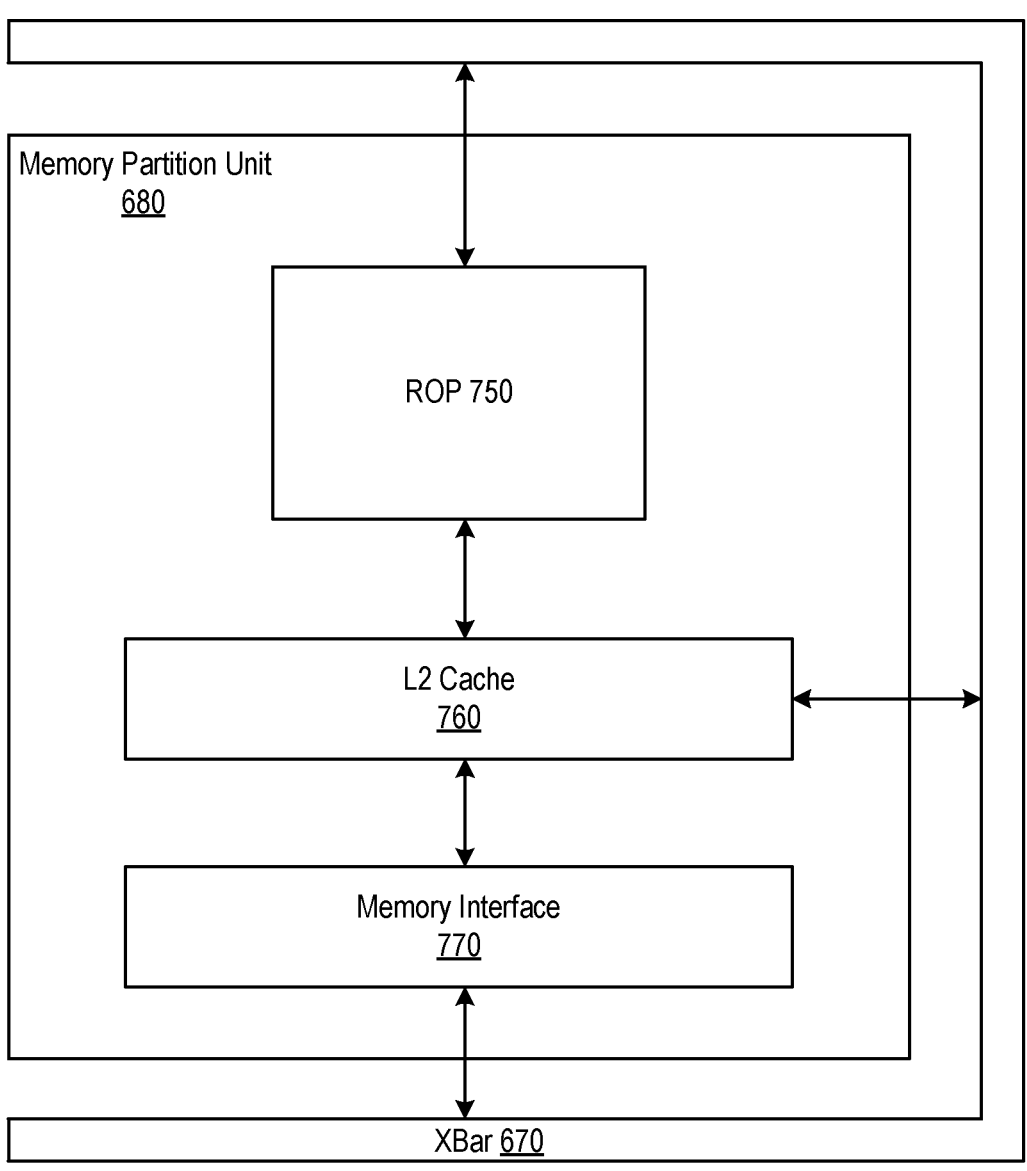
FIG. 7B illustrates a memory partition unit of the parallel processing unit of FIG. 6, in accordance with an embodiment.

The PROP unit 715 is configured to route data generated by the raster engine 725 and the DPCs 720 to a Raster Operations (ROP) unit, described in more detail in conjunction with FIG. 7B. The PROP unit 715 may also be configured to perform optimizations for color blending, organize pixel data, perform address translations, and the like.

The raster engine 725 includes a number of fixed function hardware units configured to perform various raster operations. In an embodiment, the raster engine 725 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 725 comprises fragments to be processed, for example, by a fragment shader implemented within a DPC 720.

Each DPC 720 included in the processing cluster 650 includes an M-Pipe Controller (MPC) 730, a primitive engine 735, and one or more Multiprocessors 740. The MPC 730 controls the operation of the DPC 720, routing packets received from the pipeline manager 710 to the appropriate units in the DPC 720. For example, packets associated with a vertex may be routed to the primitive engine 735, which is configured to fetch vertex attributes associated with the vertex from the memory 604. In contrast, packets associated with a shader program may be transmitted to the multiprocessor 740.

In some embodiments, the multiprocessor 740 comprises a programmable multiprocessor, such as a programmable streaming multiprocessor, that is configured to process tasks represented by a number of threads. Each multiprocessor 740 is multi-threaded and configured to execute a plurality of threads (e.g., 32 threads) from a particular group of threads concurrently. In an embodiment, the multiprocessor 740 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the multiprocessor 740 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state are maintained for each warp, enabling concurrency between warps and serial execution within warps when threads within the warp diverge. In another embodiment, a program counter, call stack, and execution state are maintained for each individual thread, enabling equal concurrency between all threads, within and between warps. When execution state is maintained for each individual thread, threads executing the same instructions may be converged and executed in parallel for maximum efficiency. The multiprocessor 740 will be described in more detail below in conjunction with FIG. 8A.

The MMU 790 provides an interface between the processing cluster 650 and the partition unit 680. The MMU 790 may provide translation of virtual addresses into physical addresses, memory protection, and arbitration of memory requests. In an embodiment, the MMU 790 provides one or more translation lookaside buffers (TLBs) for performing translation of virtual addresses into physical addresses in the memory 604.

FIG. 7B illustrates a memory partition unit 680 of the PPU 600 of FIG. 6, in accordance with an embodiment. As shown in FIG. 7B, the memory partition unit 680 includes a Raster Operations (ROP) unit 750, a level two (L2) cache 760, and a memory interface 770. The memory interface 770 is coupled to the memory 604. Memory interface 770 may implement 32, 64, 128, 1024-bit data buses, or the like, for high-speed data transfer. In an embodiment, the PPU 600 incorporates U memory interfaces 770, one memory interface 770 per pair of partition units 680, where each pair of partition units 680 is connected to a corresponding memory device 604. For example, PPU 600 may be connected to up to Y memory devices 604, such as high bandwidth memory stacks or graphics double-data-rate, version 5, synchronous dynamic random-access memory, or other types of persistent storage.

In an embodiment, the memory interface 770 implements an HBM2 memory interface and Y equals half U. In an embodiment, the HBM2 memory stacks are located on the same physical package as the PPU 600, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 604 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 600 process very large datasets and/or run applications for extended periods.

In an embodiment, the PPU 600 implements a multi-level memory hierarchy. In an embodiment, the memory partition unit 680 supports a unified memory to provide a single unified virtual address space for CPU and PPU 600 memory, enabling data sharing between virtual memory systems. In an embodiment the frequency of accesses by a PPU 600 to memory located on other processors is traced to ensure that memory pages are moved to the physical memory of the PPU 600 that is accessing the pages more frequently. In an embodiment, the NVLink 610 supports address translation services allowing the PPU 600 to directly access a CPU's page tables and providing full access to CPU memory by the PPU 600.

In an embodiment, copy engines transfer data between multiple PPUs 600 or between PPUs 600 and CPUs. The copy engines can generate page faults for addresses that are not mapped into the page tables. The memory partition unit 680 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 604 or other system memory may be fetched by the memory partition unit 680 and stored in the L2 cache 760, which is located on-chip and is shared between the various processing clusters 650. As shown, each memory partition unit 680 includes a portion of the L2 cache 760 associated with a corresponding memory device 604. Lower-level caches may then be implemented in various units within the processing clusters 650. For example, each of the multiprocessors 740 may implement a level one (L1) cache. The L1 cache is private memory that is dedicated to a particular multiprocessor 740. Data from the L2 cache 760 may be fetched and stored in each of the L1 caches for processing in the functional units of the Multiprocessors 740. The L2 cache 760 is coupled to the memory interface 770 and the XBar 670.

The ROP unit 750 performs graphics raster operations related to pixel color, such as color compression, pixel blending, and the like. The ROP unit 750 also implements depth testing in conjunction with the raster engine 725, receiving a depth for a sample location associated with a pixel fragment from the culling engine of the raster engine 725. The depth is tested against a corresponding depth in a depth buffer for a sample location associated with the fragment. If the fragment passes the depth test for the sample location, then the ROP unit 750 updates the depth buffer and transmits a result of the depth test to the raster engine 725. It will be appreciated that the number of partition units 680 may be different than the number of processing clusters 650 and, therefore, each ROP unit 750 may be coupled to each of the processing clusters 650. The ROP unit 750 tracks packets received from the different processing clusters 650 and determines which processing cluster 650 that a result generated by the ROP unit 750 is routed to through the Xbar 670. Although the ROP unit 750 is included within the memory partition unit 680 in FIG. 7B, in other embodiment, the ROP unit 750 may be outside of the memory partition unit 680. For example, the ROP unit 750 may reside in the processing cluster 650 or another unit.

Figure 8A:
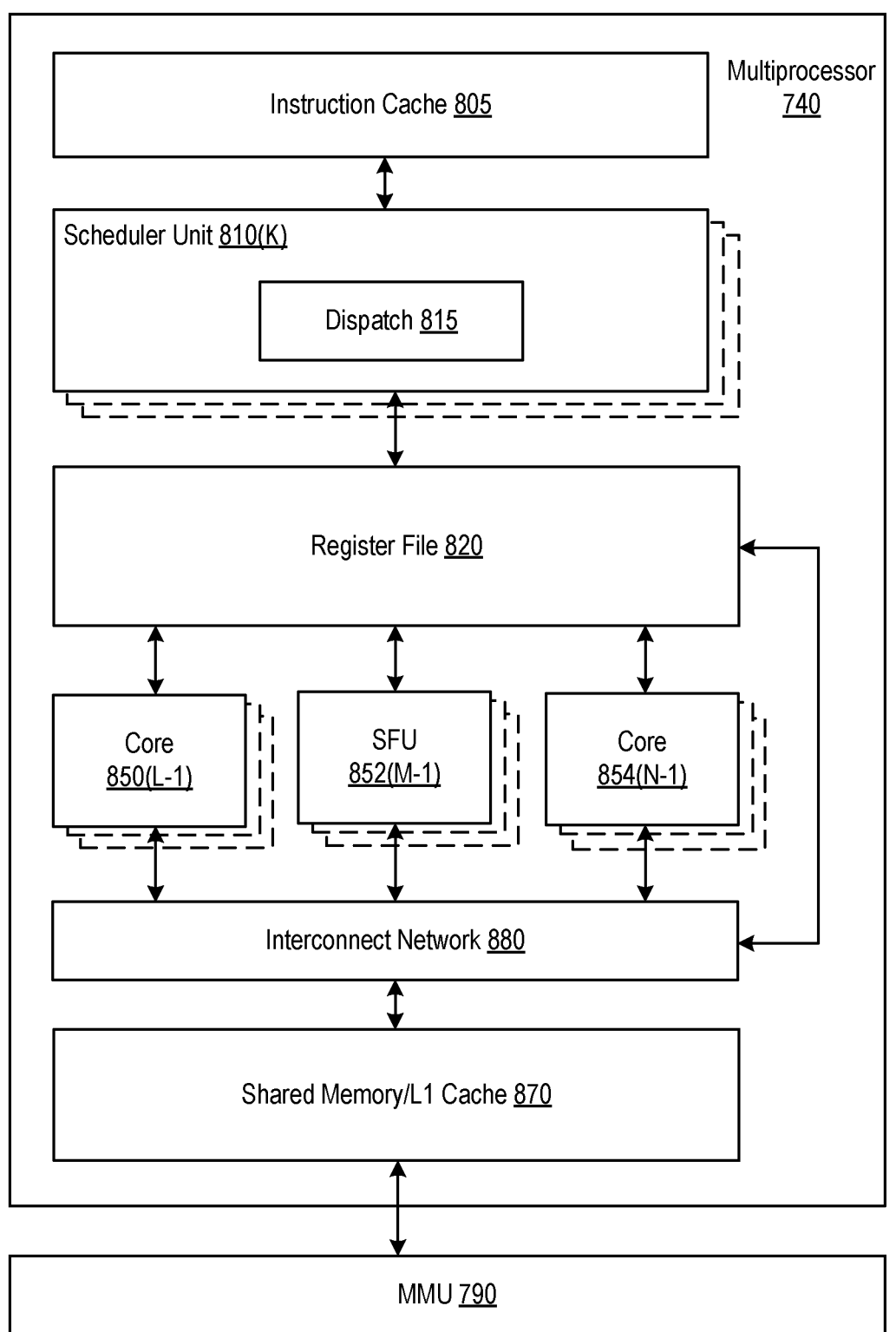
FIG. 8A illustrates the streaming multi-processor of FIG. 7A, in accordance with an embodiment.

FIG. 8A illustrates the multiprocessor 740 of FIG. 7A, in accordance with an embodiment. As shown in FIG. 8A, the multiprocessor 740 includes an instruction cache 805, one or more scheduler units 810, a register file 820, one or more processing cores 850, one or more special function units (SFUs) 852, one or more load/store units (LSUs) 854, an interconnect network 880, a shared memory/L1 cache 870.

As described above, the work distribution unit 625 dispatches tasks for execution on the processing clusters 650 of the PPU 600. The tasks are allocated to a particular DPC 720 within a processing cluster 650 and, if the task is associated with a shader program, the task may be allocated to a multiprocessor 740. The scheduler unit 810 receives the tasks from the work distribution unit 625 and manages instruction scheduling for one or more thread blocks assigned to the multiprocessor 740. The scheduler unit 810 schedules thread blocks for execution as warps of parallel threads, where each thread block is allocated at least one warp. In an embodiment, each warp executes 32 threads. The scheduler unit 810 may manage a plurality of different thread blocks, allocating the warps to the different thread blocks and then dispatching instructions from the plurality of different cooperative groups to the various functional units (e.g., cores 850, SFUs 852, and LSUs 854) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads ( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 815 is configured to transmit instructions to one or more of the functional units. In the embodiment, the scheduler unit 810 includes two dispatch units 815 that enable two different instructions from the same warp to be dispatched during each clock cycle. In alternative embodiments, each scheduler unit 810 may include a single dispatch unit 815 or additional dispatch units 815.

Each multiprocessor 740 includes a register file 820 that provides a set of registers for the functional units of the multiprocessor 740. In an embodiment, the register file 820 is divided between each of the functional units such that each functional unit is allocated a dedicated portion of the register file 820. In another embodiment, the register file 820 is divided between the different warps being executed by the multiprocessor 740. The register file 820 provides temporary storage for operands connected to the data paths of the functional units.

Each multiprocessor 740 comprises L processing cores 850. In an embodiment, the multiprocessor 740 includes a large number (e.g., 128, etc.) of distinct processing cores 850. Each core 850 may include a fully-pipelined, single-precision, double-precision, and/or mixed precision processing unit that includes a floating-point arithmetic logic unit and an integer arithmetic logic unit. In an embodiment, the floating-point arithmetic logic units implement the IEEE 754-2008 standard for floating point arithmetic. In an embodiment, the cores 850 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 850. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each multiprocessor 640 also comprises M SFUs 852 that perform special functions (e.g., attribute evaluation, reciprocal square root, and the like). In an embodiment, the SFUs 852 may include a tree traversal unit configured to traverse a hierarchical tree data structure. In an embodiment, the SFUs 852 may include texture unit configured to perform texture map filtering operations. In an embodiment, the texture units are configured to load texture maps (e.g., a 2D array of texels) from the memory 604 and sample the texture maps to produce sampled texture values for use in shader programs executed by the multiprocessor 740. In an embodiment, the texture maps are stored in the shared memory/L1 cache 770. The texture units implement texture operations such as filtering operations using mip-maps (e.g., texture maps of varying levels of detail). In an embodiment, each multiprocessor 740 includes two texture units.

Each multiprocessor 740 also comprises N LSUs 854 that implement load and store operations between the shared memory/L1 cache 870 and the register file 820. Each multiprocessor 740 includes an interconnect network 880 that connects each of the functional units to the register file 820 and the LSU 854 to the register file 820, shared memory/L1 cache 870. In an embodiment, the interconnect network 880 is a crossbar that can be configured to connect any of the functional units to any of the registers in the register file 820 and connect the LSUs 854 to the register file and memory locations in shared memory/L1 cache 870.

The shared memory/L1 cache 870 is an array of on-chip memory that allows for data storage and communication between the multiprocessor 740 and the primitive engine 735 and between threads in the multiprocessor 740. In an embodiment, the shared memory/L1 cache 870 comprises 128 KB of storage capacity and is in the path from the multiprocessor 740 to the partition unit 680. The shared memory/L1 cache 870 can be used to cache reads and writes. One or more of the shared memory/L1 cache 870, L2 cache 760, and memory 604 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 870 enables the shared memory/L1 cache 870 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 6, are bypassed, creating a much simpler programming model. In the general-purpose parallel computation configuration, the work distribution unit 625 assigns and distributes blocks of threads directly to the DPCs 720. The threads in a block execute the same program, using a unique thread ID in the calculation to ensure each thread generates unique results, using the multiprocessor 740 to execute the program and perform calculations, shared memory/L1 cache 870 to communicate between threads, and the LSU 854 to read and write global memory through the shared memory/L1 cache 870 and the memory partition unit 680. When configured for general purpose parallel computation, the multiprocessor 740 can also write commands that the scheduler unit 620 can use to launch new work on the DPCs 720.

The PPU 600 may be included in a desktop computer, a laptop computer, a tablet computer, servers, supercomputers, a smart phone (e.g., a wireless, hand-held device), personal digital assistant (PDA), a digital camera, a vehicle, a head mounted display, a hand-held electronic device, and the like. In an embodiment, the PPU 600 is embodied on a single semiconductor substrate. In another embodiment, the PPU 600 is included in a system-on-a-chip (SoC) along with one or more other devices such as additional PPUs 600, the memory 604, a reduced instruction set computer (RISC) CPU, a memory management unit (MMU), a digital-to-analog converter (DAC), and the like.

In an embodiment, the PPU 600 may be included on a graphics card that includes one or more memory devices 604. The graphics card may be configured to interface with a PCIe slot on a motherboard of a desktop computer. In yet another embodiment, the PPU 600 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 8B:
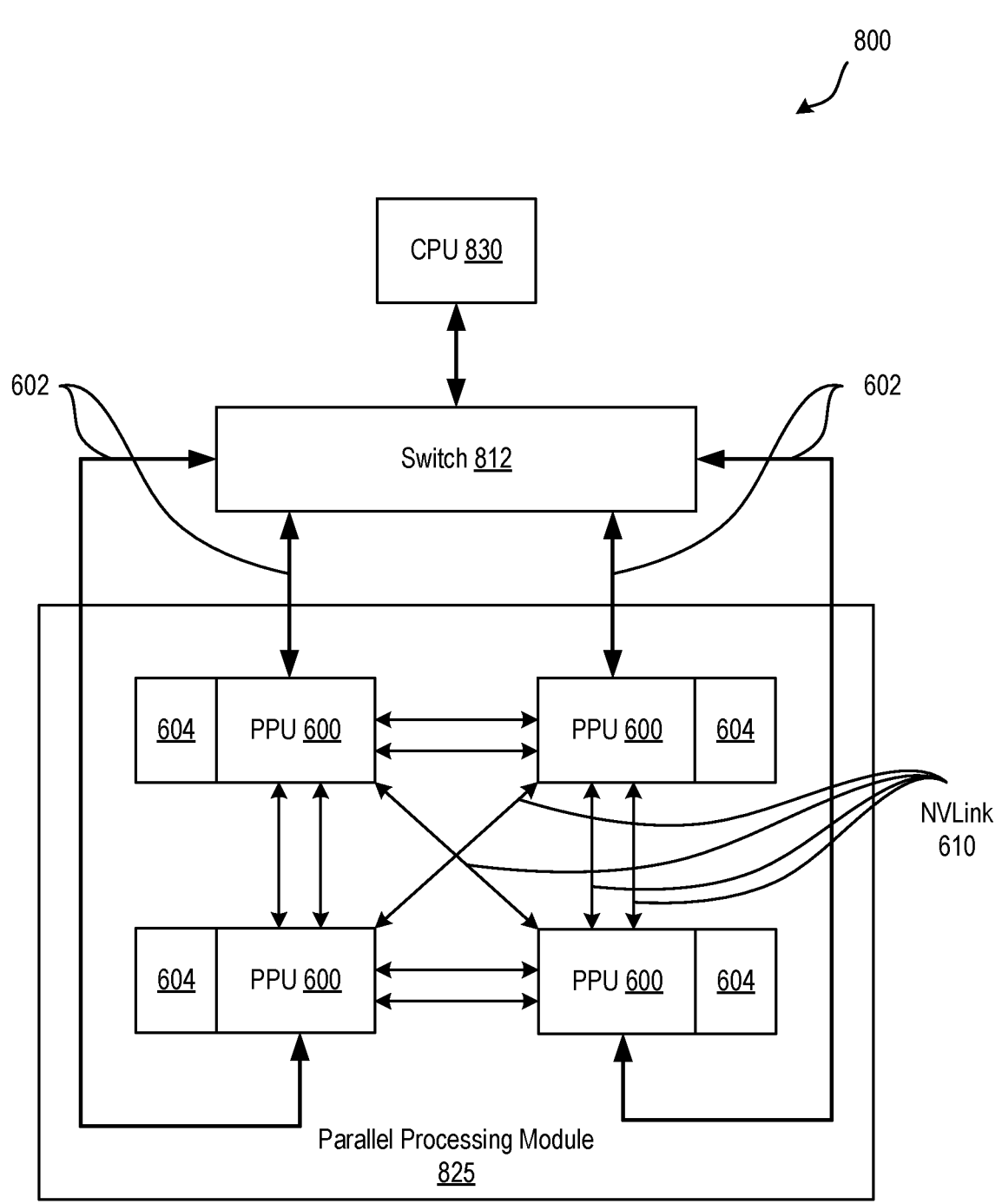
FIG. 8B is a conceptual diagram of a processing system implemented using the PPU of FIG. 6, in accordance with an embodiment.

FIG. 8B is a conceptual diagram of a processing system 800 implemented using the PPU 600 of FIG. 6, in accordance with an embodiment. The exemplary system 865 may be configured to implement the method 500 shown in FIG. 5. The processing system 800 includes a CPU 830, switch 812, and multiple PPUs 600 each and respective memories 604. The NVLink 610 provides high-speed communication links between each of the PPUs 600. Although a particular number of NVLink 610 and interconnect 602 connections are illustrated in FIG. 8B, the number of connections to each PPU 600 and the CPU 830 may vary. The switch 812 interfaces between the interconnect 602 and the CPU 830. The PPUs 600, memories 604, and NVLinks 610 may be situated on a single semiconductor platform to form a parallel processing module 825. In an embodiment, the switch 812 supports two or more protocols to interface between various different connections and/or links.

In another embodiment (not shown), the NVLink 610 provides one or more high-speed communication links between each of the PPUs 600 and the CPU 830 and the switch 812 interfaces between the interconnect 602 and each of the PPUs 600. The PPUs 600, memories 604, and interconnect 602 may be situated on a single semiconductor platform to form a parallel processing module 825. In yet another embodiment (not shown), the interconnect 602 provides one or more communication links between each of the PPUs 600 and the CPU 830 and the switch 812 interfaces between each of the PPUs 600 using the NVLink 610 to provide one or more high-speed communication links between the PPUs 600. In another embodiment (not shown), the NVLink 610 provides one or more high-speed communication links between the PPUs 600 and the CPU 830 through the switch 812. In yet another embodiment (not shown), the interconnect 602 provides one or more communication links between each of the PPUs 600 directly. One or more of the NVLink 610 high-speed communication links may be implemented as a physical NVLink interconnect or either an on-chip or on-die interconnect using the same protocol as the NVLink 610.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 825 may be implemented as a circuit board substrate and each of the PPUs 600 and/or memories 604 may be packaged devices. In an embodiment, the CPU 830, switch 812, and the parallel processing module 825 are situated on a single semiconductor platform.

In an embodiment, the signaling rate of each NVLink 610 is 20 to 26 Gigabits/second and each PPU 600 includes six NVLink 610 interfaces (as shown in FIG. 8B, five NVLink 610 interfaces are included for each PPU 600). Each NVLink 610 provides a data transfer rate of 25 Gigabytes/second in each direction, with six links providing 600 Gigabytes/second. The NVLinks 610 can be used exclusively for PPU-to-PPU communication as shown in FIG. 8B, or some combination of PPU-to-PPU and PPU-to-CPU, when the CPU 830 also includes one or more NVLink 610 interfaces.

In an embodiment, the NVLink 610 allows direct load/store/atomic access from the CPU 830 to each PPU's 600 memory 604. In an embodiment, the NVLink 610 supports coherency operations, allowing data read from the memories 604 to be stored in the cache hierarchy of the CPU 830, reducing cache access latency for the CPU 830. In an embodiment, the NVLink 610 includes support for Address Translation Services (ATS), allowing the PPU 600 to directly access page tables within the CPU 830. One or more of the NVLinks 610 may also be configured to operate in a low-power mode.

Figure 8C:
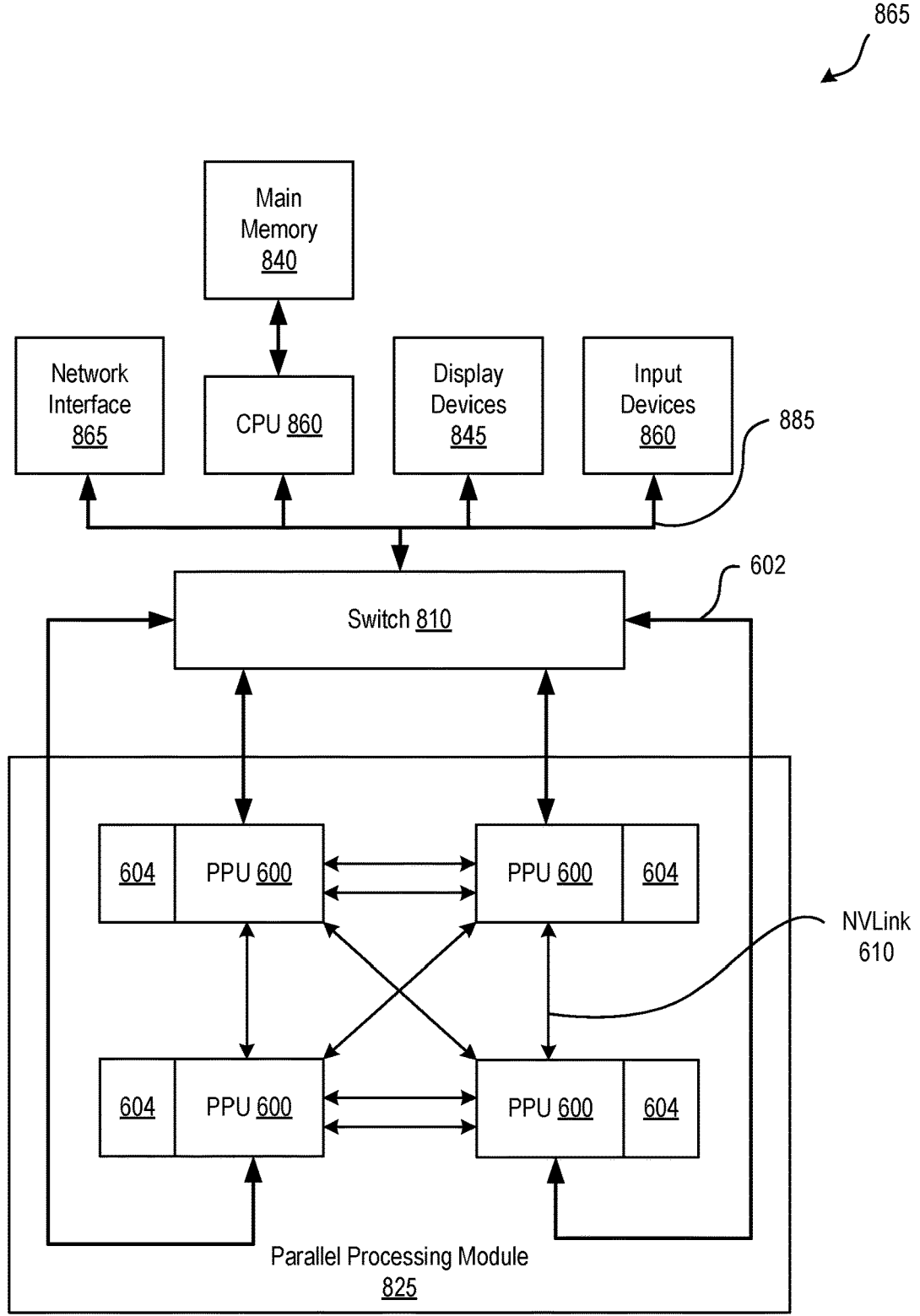
FIG. 8C illustrates an exemplary system in which the various architecture and/or functionality of the various previous embodiments may be implemented.

FIG. 8C illustrates an exemplary system 865 in which the various architecture and/or functionality of the various previous embodiments may be implemented. The exemplary system 865 may be configured to implement the method 400 shown in FIG. 4.

As shown, a system 865 is provided including at least one central processing unit 830 that is connected to a communication bus 875. The communication bus 875 may be implemented using any suitable protocol, such as PCI (Peripheral Component Interconnect), PCI-Express, AGP (Accelerated Graphics Port), HyperTransport, or any other bus or point-to-point communication protocol(s). The system 865 also includes a main memory 840. Control logic (software) and data are stored in the main memory 840 which may take the form of random-access memory (RAM).

The system 865 also includes input devices 860, the parallel processing system 825, and display devices 845, e.g., a conventional CRT (cathode ray tube), LCD (liquid crystal display), LED (light emitting diode), plasma display or the like. User input may be received from the input devices 860, e.g., keyboard, mouse, touchpad, microphone, and the like. Each of the foregoing modules and/or devices may even be situated on a single semiconductor platform to form the system 865. Alternately, the various modules may also be situated separately or in various combinations of semiconductor platforms per the desires of the user.

Further, the system 865 may be coupled to a network (e.g., a telecommunications network, local area network (LAN), wireless network, wide area network (WAN) such as the Internet, peer-to-peer network, cable network, or the like) through a network interface 835 for communication purposes.

The system 865 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 840 and/or the secondary storage. Such computer programs, when executed, enable the system 865 to perform various functions. The memory 840, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 865 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 600 comprises a graphics processing unit (GPU). The PPU 600 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 600 can be configured to process the graphics primitives to generate a frame buffer (e.g., pixel data for each of the pixels of the display).

An application writes model data for a scene (e.g., a collection of vertices and attributes) to a memory such as a system memory or memory 604. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the multiprocessors 740 of the PPU 600 including one or more of a vertex shader, hull shader, domain shader, geometry shader, and a pixel shader. For example, one or more of the multiprocessors 740 may be configured to execute a vertex shader program that processes a number of vertices defined by the model data. In an embodiment, the different multiprocessors 740 may be configured to execute different shader programs concurrently. For example, a first subset of multiprocessors 740 may be configured to execute a vertex shader program while a second subset of multiprocessors 740 may be configured to execute a pixel shader program. The first subset of multiprocessors 740 processes vertex data to produce processed vertex data and writes the processed vertex data to the L2 cache 460 and/or the memory 604. After the processed vertex data is rasterized (e.g., transformed from three-dimensional data into two-dimensional data in screen space) to produce fragment data, the second subset of multiprocessors 740 executes a pixel shader to produce processed fragment data, which is then blended with other processed fragment data and written to the frame buffer in memory 604. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 9:
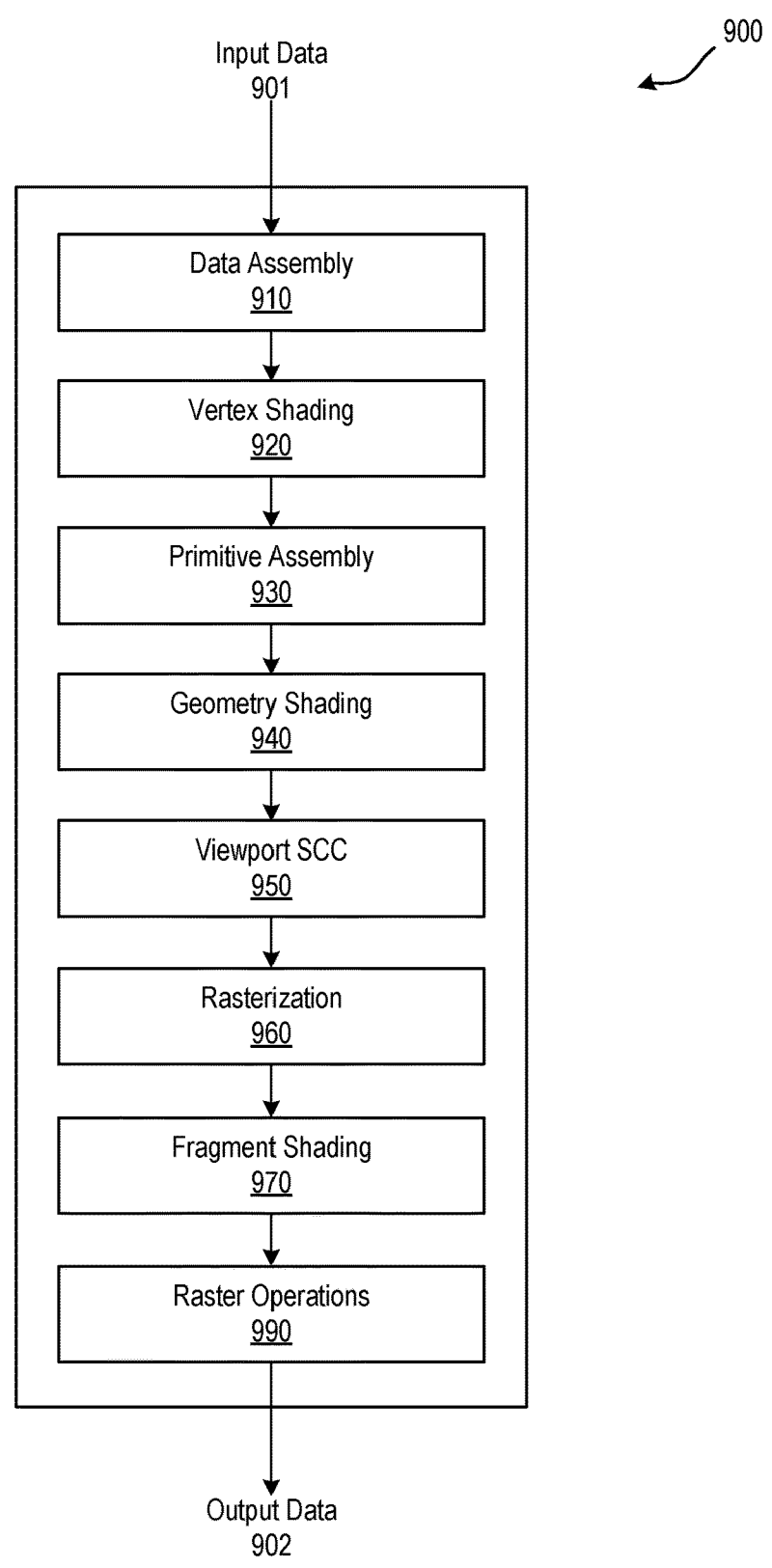
FIG. 9 is a conceptual diagram of a graphics processing pipeline implemented by the PPU of FIG. 6, in accordance with an embodiment.

FIG. 9 is a conceptual diagram of a graphics processing pipeline 900 implemented by the PPU 600 of FIG. 6, in accordance with an embodiment. The graphics processing pipeline 900 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 900 receives input data 901 that is transmitted from one stage to the next stage of the graphics processing pipeline 900 to generate output data 902. In an embodiment, the graphics processing pipeline 900 may represent a graphics processing pipeline defined by the OpenGL® API. As an option, the graphics processing pipeline 900 may be implemented in the context of the functionality and architecture of the previous Figures and/or any subsequent Figure(s).

As shown in FIG. 9, the graphics processing pipeline 900 comprises a pipeline architecture that includes a number of stages. The stages include, but are not limited to, a data assembly stage 910, a vertex shading stage 920, a primitive assembly stage 930, a geometry shading stage 940, a viewport scale, cull, and clip (VSCC) stage 950, a rasterization stage 960, a fragment shading stage 970, and a raster operations stage 980. In an embodiment, the input data 901 comprises commands that configure the processing units to implement the stages of the graphics processing pipeline 900 and geometric primitives (e.g., points, lines, triangles, quads, triangle strips or fans, etc.) to be processed by the stages. The output data 902 may comprise pixel data (e.g., color data) that is copied into a frame buffer or other type of surface data structure in a memory.

The data assembly stage 910 receives the input data 901 that specifies vertex data for high-order surfaces, primitives, or the like. The data assembly stage 910 collects the vertex data in a temporary storage or queue, such as by receiving a command from the host processor that includes a pointer to a buffer in memory and reading the vertex data from the buffer. The vertex data is then transmitted to the vertex shading stage 920 for processing.

The vertex shading stage 920 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 920 may manipulate individual vertex attributes such as position, color, texture coordinates, and the like. In other words, the vertex shading stage 920 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 920 generates transformed vertex data that is transmitted to the primitive assembly stage 930.

The primitive assembly stage 930 collects vertices output by the vertex shading stage 920 and groups the vertices into geometric primitives for processing by the geometry shading stage 940. For example, the primitive assembly stage 930 may be configured to group every three consecutive vertices as a geometric primitive (e.g., a triangle) for transmission to the geometry shading stage 940. In some embodiments, specific vertices may be reused for consecutive geometric primitives (e.g., two consecutive triangles in a triangle strip may share two vertices). The primitive assembly stage 930 transmits geometric primitives (e.g., a collection of associated vertices) to the geometry shading stage 940.

The geometry shading stage 940 processes geometric primitives by performing a set of operations (e.g., a geometry shader or program) on the geometric primitives. Tessellation operations may generate one or more geometric primitives from each geometric primitive. In other words, the geometry shading stage 940 may subdivide each geometric primitive into a finer mesh of two or more geometric primitives for processing by the rest of the graphics processing pipeline 900. The geometry shading stage 940 transmits geometric primitives to the viewport SCC stage 950.

In an embodiment, the graphics processing pipeline 900 may operate within a multiprocessor and the vertex shading stage 920, the primitive assembly stage 930, the geometry shading stage 940, the fragment shading stage 970, and/or hardware/software associated therewith, may sequentially perform processing operations. Once the sequential processing operations are complete, in an embodiment, the viewport SCC stage 950 may utilize the data. In an embodiment, primitive data processed by one or more of the stages in the graphics processing pipeline 900 may be written to a cache (e.g., L1 cache, a vertex cache, etc.). In this case, in an embodiment, the viewport SCC stage 950 may access the data in the cache. In an embodiment, the viewport SCC stage 950 and the rasterization stage 960 are implemented as fixed function circuitry.

The viewport SCC stage 950 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 960.

The rasterization stage 960 converts the 3D geometric primitives into 2D fragments (e.g., capable of being utilized for display, etc.). The rasterization stage 960 may be configured to utilize the vertices of the geometric primitives to setup a set of plane equations from which various attributes can be interpolated. The rasterization stage 960 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 960 generates fragment data (e.g., interpolated vertex attributes associated with a particular sample location for each covered pixel) that are transmitted to the fragment shading stage 970.

The fragment shading stage 970 processes fragment data by performing a set of operations (e.g., a fragment shader or a program) on each of the fragments. The fragment shading stage 970 may generate pixel data (e.g., color values) for the fragment such as by performing lighting operations or sampling texture maps using interpolated texture coordinates for the fragment. The fragment shading stage 970 generates pixel data that is transmitted to the raster operations stage 980.

The raster operations stage 980 may perform various operations on the pixel data such as performing alpha tests, stencil tests, and blending the pixel data with other pixel data corresponding to other fragments associated with the pixel. When the raster operations stage 980 has finished processing the pixel data (e.g., the output data 902), the pixel data may be written to a render target such as a frame buffer, a color buffer, or the like.

It will be appreciated that one or more additional stages may be included in the graphics processing pipeline 900 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 940). Other types of graphics processing pipelines are contemplated as being within the scope of the present disclosure. Furthermore, any of the stages of the graphics processing pipeline 900 may be implemented by one or more dedicated hardware units within a graphics processor such as PPU 600. Other stages of the graphics processing pipeline 900 may be implemented by programmable hardware units such as the multiprocessors 740 of the PPU 600.

The graphics processing pipeline 900 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 600. The API provides an abstraction for a programmer that lets a programmer utilize specialized graphics hardware, such as the PPU 600, to generate the graphical data without requiring the programmer to utilize the specific instruction set for the PPU 600. The application may include an API call that is routed to the device driver for the PPU 600. The device driver interprets the API call and performs various operations to respond to the API call. In some instances, the device driver may perform operations by executing instructions on the CPU. In other instances, the device driver may perform operations, at least in part, by launching operations on the PPU 600 utilizing an input/output interface between the CPU and the PPU 600. In an embodiment, the device driver is configured to implement the graphics processing pipeline 900 utilizing the hardware of the PPU 600.

Various programs may be executed within the PPU 600 in order to implement the various stages of the graphics processing pipeline 900. For example, the device driver may launch a kernel on the PPU 600 to perform the vertex shading stage 920 on one multiprocessors 740 (or multiple multiprocessors 740). The device driver (or the initial kernel executed by the PPU 600) may also launch other kernels on the PPU 600 to perform other stages of the graphics processing pipeline 900, such as the geometry shading stage 940 and the fragment shading stage 970. In addition, some of the stages of the graphics processing pipeline 900 may be implemented on fixed unit hardware such as a rasterizer or a data assembler implemented within the PPU 600. It will be appreciated that results from one kernel may be processed by one or more intervening fixed function hardware units before being processed by a subsequent kernel on an multiprocessors 740.

Machine Learning

Deep neural networks (DNNs) developed on processors, such as the PPU 600 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy.

In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 600. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 600 is a computing platform capable of delivering performance required for deep neural network-based artificial intelligence and machine learning applications.

What is claimed is:

1. A system comprising:

a first memory including a first plurality of memory blocks of a tensor memory;

a first register implemented as a hardware register configured to maintain a bitmap using a first portion of bits of the first register, wherein each bit of the first portion of bits of the first register represents a corresponding memory block of the first plurality of memory blocks;

a processing device, operatively coupled with the first memory and the first register, wherein the processing device comprises a plurality of multiprocessors, wherein the first register is disposed within a multiprocessor of the plurality of multiprocessors, and wherein the first memory is disposed on the multiprocessor, and wherein the processing device is to:

receive a first request to allocate one or more memory blocks of the first plurality of memory blocks;

identify a consecutive set of the first portion of bits of the first register with a first logical state, wherein the first logical state indicates that corresponding memory blocks of the one or more memory blocks are free;

perform an atomic operation to adjust the consecutive set of the first portion of bits of the first register to a second logical state, wherein the atomic operation comprises a read-modify-write operation that executes without interruption by other memory accesses to the first register; and send an allocation address comprising an index of the consecutive set of the first portion of bits of the first register to the first request, wherein the allocation address is useable to access the corresponding memory blocks.

2. The system of claim 1, wherein the consecutive set of the first portion of bits of the first register is aligned with a size of the corresponding memory blocks.

3. The system of claim 1, wherein the processing device is further to:

receive a request to deallocate the one or more memory blocks;

identify the consecutive set of the first portion of bits; and perform a second operation to adjust the consecutive set of the first portion of bits to the first logical state.

4. The system of claim 1, further comprising:

a second memory, operatively coupled with the processing device, including a second plurality of memory blocks;

a second register, operatively coupled with the processing device, configured to maintain a bitmap using a first portion of bits of the second register, wherein each bit of the first portion of bits of the second register represents a corresponding memory block of the second plurality of memory blocks, and wherein the processing device is further to:

receive, with the first request, an indication to allocate one or more memory blocks of the second plurality of memory blocks uniformly with the one or more memory blocks of the first plurality of memory blocks;

identify a consecutive set of the first portion of bits of the second register using the consecutive set of the first portion of bits of the first register; and perform a second operation to modify the consecutive set of the first portion of bits of the second register to a second logical state, wherein an index of the consecutive set of the first portion of bits of the second register is a same index as the index of the consecutive set of the first portion of bits of the first register.

5. The system of claim 1, wherein the processing device comprises a parallel processing unit (PPU), and wherein the first request comprises a first instruction issued by a first thread executing on the PPU.

6. The system of claim 5, wherein PPU is to:

identify one or more instructions issued by one or more additional threads executing concurrently with the first thread; and sequence one or more operations of the one or more additional threads to prevent the one or more operations from altering the consecutive set of the first portion of bits of the first register until the atomic operation is complete.

7. The system of claim 1, wherein the first memory is a tensor memory.

8. The system of claim 1, wherein the processing device is configured to use a second portion of bits of the first register for at least one of message passing, synchronization, or memory allocation fairness.

9. A method comprising:

receiving, by a processing device, a first request to allocate one or more memory blocks of a first plurality of memory blocks of a tensor memory associated with a first memory;

identifying a consecutive set of a first portion of bits of a first register implemented as a hardware register of the processing device with a first logical state, wherein the first logical state indicates that corresponding memory blocks of the one or more memory blocks are free, wherein the processing device comprises a plurality of multiprocessors, wherein the first register is disposed within a multiprocessor of the plurality of multiprocessors, and wherein the first memory is disposed on the multiprocessor;

performing an atomic operation to adjust the consecutive set of the first portion of bits of the first register to a second logical state, wherein the atomic operation comprises a read-modify-write operation that executes without interruption by other memory accesses to the first register; and sending an allocation address comprising an index of the consecutive set of the first portion of bits of the first register to the first request, wherein the allocation address is useable to access the corresponding memory blocks.

10. The method of claim 9, wherein the consecutive set of the first portion of bits of the first register is aligned with a size of the corresponding memory blocks.

11. The method of claim 9, further comprising:

receiving a request to deallocate the one or more memory blocks;

identifying the consecutive set of the first portion of bits; and performing a second operation to adjust the consecutive set of the first portion of bits to the first logical state.

12. The method of claim 9, further comprising:

receiving, with the first request, an indication to allocate one or more memory blocks of a second plurality of memory blocks associated with a second memory uniformly with the one or more memory blocks of the first plurality of memory blocks;

identifying a consecutive set of a first portion of bits of a second register using the consecutive set of the first portion of bits of the first register; and performing a second operation to modify the consecutive set of the first portion of bits of the second register to a second logical state, wherein an index of the consecutive set of the first portion of bits of the second register is a same index as the index of the consecutive set of the first portion of bits of the first register.

13. The method of claim 9, wherein the processing device comprises a parallel processing unit (PPU), and wherein the first request comprises a first instruction issued by a first thread executing on the PPU.

14. The method of claim 13, further comprising:

identifying one or more instructions issued by one or more additional threads executing concurrently with the first thread; and sequencing one or more operations of the one or more additional threads to prevent the one or more operations from altering the consecutive set of the first portion of bits of the first register until the atomic operation is complete.

15. The method of claim 9, wherein the processing device comprises a graphics processing unit (GPU) and wherein the first register is associated with a first multiprocessor within the GPU.

16. The method of claim 9, wherein the first memory is a tensor memory.

17. The method of claim 9, further comprising:

using a second portion of bits of the first register for at least one of message passing, synchronization, or memory allocation fairness.

18. A parallel processing unit (PPU) comprising:

a first memory including a first plurality of memory blocks of a tensor memory;

a first register implemented as a hardware register configured to maintain a bitmap using a first portion of bits of the first register, wherein each bit of the first portion of bits of the first register represents a corresponding memory block of the first plurality of memory blocks, wherein the PPU comprises a plurality of multiprocessors, wherein the first register is disposed within a multiprocessor of the plurality of multiprocessors, and wherein the first memory is disposed on the multiprocessor, and wherein the PPU is to:

receive a first request to allocate one or more memory blocks of the first plurality of memory blocks;

identify a consecutive set of the first portion of bits of the first register with a first logical state, wherein the first logical state indicates that corresponding memory blocks of the one or more memory blocks are free;

perform an atomic operation to adjust the consecutive set of the first portion of bits of the first register to a second logical state, wherein the atomic operation comprises a read-modify-write operation that executes without interruption by other memory accesses to the first register; and send an allocation address comprising an index of the consecutive set of the first portion of bits of the first register to the first request, wherein the allocation address is useable to access the corresponding memory blocks.

19. The PPU of claim 18, wherein the consecutive set of the first portion of bits of the first register is aligned with a size of the corresponding memory blocks.

20. The PPU of claim 18, wherein the PPU is further to:

receive a request to deallocate the one or more memory blocks;

identify the consecutive set of the first portion of bits; and perform a second operation to adjust the consecutive set of the first portion of bits to the first logical state.

* * * * *